United States Patent [10] Patent No.: US 10,936,650 B2
Grandhi et al. (45) Date of Patent: Mar. 2, 2021

(54) METHOD AND APPARATUS FOR IMAGE RECOGNITION SERVICES

(75) Inventors: Roopnath Grandhi, Sunnyvale, CA (US); Raghav Gupta, Sunnyvale, CA (US); Neelakantan Sundaresan, Mountain View, CA (US); Denis Golovnya, Allston, MA (US); Jeffrey Olson, Charlton, MA (US)

(73) Assignee: eBay Inc., San Jose, CA (US)

( * ) Notice: Subject to any disclaimer, the term of this patent is extended or adjusted under 35 U.S.C. 154(b) by 849 days.

(21) Appl. No.: 12/398,957

(22) Filed: Mar. 5, 2009

(65) Prior Publication Data

US 2009/0240735 A1 Sep. 24, 2009

Related U.S. Application Data

(60) Provisional application No. 61/033,940, filed on Mar. 5, 2008.

(51) Int. Cl.
*G06F 17/30* (2006.01)
*G06F 16/583* (2019.01)
*G06F 16/432* (2019.01)
*G06Q 30/06* (2012.01)

(52) U.S. Cl.
CPC ........ *G06F 16/5838* (2019.01); *G06F 16/434* (2019.01); *G06F 16/583* (2019.01); *G06Q 30/06* (2013.01)

(58) Field of Classification Search
CPC ......... G06F 17/30247; G06F 17/30256; G06F 17/30047; G06F 16/583; G06F 16/5838; G06Q 30/06

USPC .......................................... 707/708
See application file for complete search history.

(56) References Cited

U.S. PATENT DOCUMENTS

| 5,068,723 A | 11/1991 | Dixit |
| 5,546,475 A | 8/1996 | Bolle et al. |
| 5,579,471 A * | 11/1996 | Barber ................. G06K 9/4647 715/700 |
| 5,692,012 A | 11/1997 | Virtamo et al. |
| 5,781,899 A | 7/1998 | Hirata |

(Continued)

FOREIGN PATENT DOCUMENTS

| AU | 2012212601 B2 | 10/2013 |
| AU | 2015264850 B2 | 4/2017 |

(Continued)

OTHER PUBLICATIONS eBay Inc., RedLaser: Impossibly Accurate Barcode Scanning, 2011, http://redlaser.com/index.php#features (visited Jul. 8, 2011).*

(Continued)

*Primary Examiner* — James Trujillo
*Assistant Examiner* — Kurt A Mueller
(74) *Attorney, Agent, or Firm* — Mintz Levin Cohn Ferris Glovsky and Popeo, P.C.

(57) ABSTRACT

A system to provide image processing services responsive to requests including image data includes a system layer that forwards a request to an image application processing interface. Image processing provides an image comparison, barcode recognition, and optical character recognition. The image processing compares the image data to products in a database in order to identify a matching product. The system layer receives the matching information and forwards to a user.

33 Claims, 15 Drawing Sheets

(56) References Cited

U.S. PATENT DOCUMENTS

| | | |
|---|---|---|
| 5,802,361 A | 9/1998 | Wang et al. |
| 5,818,964 A | 10/1998 | Itoh |
| 5,870,149 A | 2/1999 | Comroe et al. |
| 5,889,896 A * | 3/1999 | Meshinsky et al. .......... 382/305 |
| 5,949,429 A | 9/1999 | Bonneau et al. |
| 6,154,738 A * | 11/2000 | Call .................... G06Q 20/201 |
| | | 705/20 |
| 6,157,435 A | 12/2000 | Slater et al. |
| 6,216,227 B1 | 4/2001 | Goldstein et al. |
| 6,278,446 B1 | 8/2001 | Liou et al. |
| 6,292,593 B1 | 9/2001 | Nako et al. |
| 6,463,426 B1 | 10/2002 | Lipson et al. |
| 6,477,269 B1 | 11/2002 | Brechner |
| 6,483,570 B1 | 11/2002 | Slater et al. |
| 6,484,130 B2 | 11/2002 | Dwyer et al. |
| 6,512,919 B2 | 1/2003 | Ogasawara |
| 6,530,521 B1 | 3/2003 | Henry |
| 6,549,913 B1 | 4/2003 | Murakawa |
| 6,563,959 B1 | 5/2003 | Troyanker |
| 6,589,290 B1 | 7/2003 | Maxwell et al. |
| 6,642,929 B1 | 11/2003 | Essafi et al. |
| 6,763,148 B1 | 7/2004 | Sternberg et al. |
| 6,947,571 B1 | 9/2005 | Rhoads et al. |
| 7,022,281 B1 | 4/2006 | Senff |
| 7,023,441 B2 | 4/2006 | Choi et al. |
| 7,062,722 B1 | 6/2006 | Carlin et al. |
| 7,130,466 B2 | 10/2006 | Seeber |
| 7,254,779 B1 | 8/2007 | Rezvani et al. |
| 7,257,268 B2 | 8/2007 | Eichhorn et al. |
| 7,281,018 B1 | 10/2007 | Begun et al. |
| 7,346,453 B2 | 3/2008 | Matsuoka |
| 7,460,735 B1 | 12/2008 | Rowley et al. |
| 7,478,143 B1 | 1/2009 | Friedman et al. |
| 7,593,602 B2 | 9/2009 | Stentiford |
| 7,702,185 B2 | 4/2010 | Keating et al. |
| 7,801,893 B2 | 9/2010 | Gulli et al. |
| 7,848,764 B2 | 12/2010 | Riise et al. |
| 7,890,386 B1 | 2/2011 | Reber |
| 7,921,040 B2 | 4/2011 | Reber |
| 7,933,811 B2 | 4/2011 | Reber |
| 7,957,510 B2 | 6/2011 | Denney et al. |
| 8,130,242 B2 | 3/2012 | Cohen |
| 8,239,130 B1 | 8/2012 | Upstill et al. |
| 8,370,062 B1 | 2/2013 | Starenky et al. |
| 8,385,646 B2 | 2/2013 | Lang et al. |
| 8,825,660 B2 | 9/2014 | Chittar |
| 9,240,059 B2 | 1/2016 | Zises |
| 9,449,342 B2 | 9/2016 | Sacco |
| 9,495,386 B2 * | 11/2016 | Tapley ................. G06K 9/4652 |
| 9,530,059 B2 | 12/2016 | Zises |
| 2002/0002504 A1 | 1/2002 | Engel et al. |
| 2002/0027694 A1 | 3/2002 | Kim et al. |
| 2002/0094189 A1 | 7/2002 | Navab et al. |
| 2002/0107737 A1 | 8/2002 | Kaneko et al. |
| 2002/0116286 A1 | 8/2002 | Walker et al. |
| 2002/0146176 A1 | 10/2002 | Meyers |
| 2003/0018652 A1 | 1/2003 | Beckerman et al. |
| 2003/0028873 A1 | 2/2003 | Lemmons |
| 2003/0053706 A1 | 3/2003 | Hong et al. |
| 2003/0101105 A1 | 5/2003 | Vock |
| 2003/0130910 A1 | 7/2003 | Pickover et al. |
| 2003/0147623 A1 | 8/2003 | Fletcher |
| 2003/0208409 A1 | 11/2003 | Mault |
| 2003/0229537 A1 | 12/2003 | Dunning et al. |
| 2003/0231806 A1 | 12/2003 | Troyanker |
| 2004/0019643 A1 * | 1/2004 | Zirnstein, Jr. ........... G06F 9/546 |
| | | 709/206 |
| 2004/0057627 A1 | 3/2004 | Abe et al. |
| 2004/0128320 A1 | 7/2004 | Grove et al. |
| 2004/0133927 A1 | 7/2004 | Sternberg et al. |
| 2005/0001852 A1 | 1/2005 | Dengler et al. |
| 2005/0004850 A1 | 1/2005 | Gutbrod et al. |
| 2005/0010486 A1 * | 1/2005 | Pandhe ................. G06Q 30/02 |
| | | 705/26.8 |
| 2005/0084154 A1 | 4/2005 | Li et al. |
| 2005/0091597 A1 | 4/2005 | Ackley |
| 2005/0151743 A1 | 7/2005 | Sitrick |
| 2005/0162419 A1 | 7/2005 | Kim et al. |
| 2005/0162523 A1 | 7/2005 | Darrell et al. |
| 2005/0171864 A1 | 8/2005 | Nakade et al. |
| 2005/0182792 A1 | 8/2005 | Israel et al. |
| 2005/0193006 A1 | 9/2005 | Bandas et al. |
| 2005/0222987 A1 | 10/2005 | Vadon |
| 2005/0283379 A1 | 12/2005 | Reber |
| 2006/0004850 A1 | 1/2006 | Chowdhury |
| 2006/0012677 A1 | 1/2006 | Neven et al. |
| 2006/0013481 A1 | 1/2006 | Park et al. |
| 2006/0015492 A1 | 1/2006 | Keating et al. |
| 2006/0058948 A1 | 3/2006 | Blass et al. |
| 2006/0116935 A1 | 6/2006 | Evans |
| 2006/0120686 A1 * | 6/2006 | Liebenow ....................... 386/40 |
| 2006/0149638 A1 | 7/2006 | Allen |
| 2006/0240862 A1 * | 10/2006 | Neven .................... G06K 9/228 |
| | | 455/550.1 |
| 2007/0005576 A1 | 1/2007 | Cutrell et al. |
| 2007/0015586 A1 | 1/2007 | Huston |
| 2007/0078846 A1 | 4/2007 | Gulli et al. |
| 2007/0104348 A1 | 5/2007 | Cohen |
| 2007/0122947 A1 | 5/2007 | Sakurai et al. |
| 2007/0133947 A1 * | 6/2007 | Armitage .......... G06F 17/30256 |
| | | 386/224 |
| 2007/0150403 A1 * | 6/2007 | Mock .................... G06Q 30/08 |
| | | 705/37 |
| 2007/0172155 A1 | 7/2007 | Guckenberger |
| 2007/0230817 A1 | 10/2007 | Kokojima |
| 2007/0300161 A1 | 12/2007 | Bhatia et al. |
| 2008/0037877 A1 | 2/2008 | Jia et al. |
| 2008/0059055 A1 | 3/2008 | Geelen et al. |
| 2008/0082426 A1 | 4/2008 | Gokturk et al. |
| 2008/0170810 A1 | 7/2008 | Wu et al. |
| 2008/0177640 A1 | 7/2008 | Gokturk et al. |
| 2008/0194323 A1 | 8/2008 | Merkli et al. |
| 2008/0201241 A1 | 8/2008 | Pecoraro |
| 2008/0205755 A1 | 8/2008 | Jackson et al. |
| 2008/0205764 A1 | 8/2008 | Iwai et al. |
| 2008/0207357 A1 | 8/2008 | Savarese et al. |
| 2008/0240575 A1 | 10/2008 | Panda et al. |
| 2008/0268876 A1 | 10/2008 | Gelfand et al. |
| 2008/0278778 A1 | 11/2008 | Saino |
| 2008/0288338 A1 * | 11/2008 | Wiseman ................ G06Q 30/02 |
| | | 705/14.69 |
| 2008/0288477 A1 | 11/2008 | Kim et al. |
| 2009/0028435 A1 | 1/2009 | Wu et al. |
| 2009/0028446 A1 | 1/2009 | Wu et al. |
| 2009/0034260 A1 * | 2/2009 | Ziemkowski ........ G02B 7/1824 |
| | | 362/259 |
| 2009/0094260 A1 * | 4/2009 | Cheng .................... G06Q 30/02 |
| 2009/0106127 A1 * | 4/2009 | Purdy ................ G06Q 30/0601 |
| | | 705/26.1 |
| 2009/0232354 A1 | 9/2009 | Camp et al. |
| 2009/0235181 A1 | 9/2009 | Saliba et al. |
| 2009/0235187 A1 | 9/2009 | Kim et al. |
| 2009/0240735 A1 * | 9/2009 | Grandhi et al. ........... 707/104.1 |
| 2009/0245638 A1 | 10/2009 | Collier et al. |
| 2009/0262137 A1 | 10/2009 | Walker et al. |
| 2009/0324100 A1 | 12/2009 | Kletter et al. |
| 2009/0325554 A1 | 12/2009 | Reber |
| 2010/0015960 A1 | 1/2010 | Reber |
| 2010/0015961 A1 | 1/2010 | Reber |
| 2010/0015962 A1 | 1/2010 | Reber |
| 2010/0034469 A1 | 2/2010 | Thorpe et al. |
| 2010/0037177 A1 | 2/2010 | Golsorkhi |
| 2010/0046842 A1 | 2/2010 | Conwell et al. |
| 2010/0131714 A1 | 5/2010 | Chandrasekaran |
| 2010/0171758 A1 | 7/2010 | Maassel et al. |
| 2010/0171999 A1 | 7/2010 | Namikata et al. |
| 2010/0185529 A1 | 7/2010 | Chesnut et al. |
| 2010/0241650 A1 | 9/2010 | Chittar |
| 2010/0260426 A1 | 10/2010 | Huang et al. |
| 2010/0281417 A1 | 11/2010 | Yolleck et al. |
| 2010/0332304 A1 | 12/2010 | Higgins et al. |
| 2011/0029334 A1 | 2/2011 | Reber |
| 2011/0053642 A1 | 3/2011 | Lee |
| 2011/0061011 A1 | 3/2011 | Hoguet |

(56) References Cited

U.S. PATENT DOCUMENTS

| | | |
|---|---|---|
| 2011/0084983 A1 | 4/2011 | Demaine |
| 2011/0128300 A1 | 6/2011 | Gay et al. |
| 2011/0143731 A1 | 6/2011 | Ramer et al. |
| 2011/0215138 A1 | 9/2011 | Crum |
| 2012/0099800 A1 | 4/2012 | Llano et al. |
| 2012/0105475 A1 | 5/2012 | Tseng |
| 2012/0113141 A1 | 5/2012 | Zimmerman et al. |
| 2012/0120113 A1 | 5/2012 | Hueso |
| 2012/0165046 A1 | 6/2012 | Rhoads et al. |
| 2012/0230581 A1 | 9/2012 | Miyashita et al. |
| 2012/0308077 A1 | 12/2012 | Tseng |
| 2012/0327115 A1 | 12/2012 | Chhetri et al. |
| 2013/0073365 A1 | 3/2013 | McCarthy |
| 2013/0103306 A1 | 4/2013 | Uetake |
| 2013/0106910 A1 | 5/2013 | Sacco |
| 2013/0116922 A1 | 5/2013 | Cai et al. |
| 2013/0144701 A1 | 6/2013 | Kulasooriya et al. |
| 2013/0170697 A1 | 7/2013 | Zises |
| 2014/0007012 A1 | 1/2014 | Govande et al. |
| 2014/0372449 A1 | 12/2014 | Chittar |
| 2016/0019723 A1 | 1/2016 | Tapley et al. |
| 2016/0034944 A1* | 2/2016 | Raab ............. G06Q 30/0241 705/14.4 |
| 2016/0171305 A1 | 6/2016 | Zises |
| 2017/0046593 A1 | 2/2017 | Tapley et al. |
| 2017/0091975 A1 | 3/2017 | Zises |
| 2018/0189863 A1 | 7/2018 | Tapley et al. |
| 2019/0266614 A1 | 8/2019 | Grandhi et al. |

FOREIGN PATENT DOCUMENTS

| | | |
|---|---|---|
| CN | 1255989 A | 6/2000 |
| CN | 1750001 A | 3/2006 |
| CN | 1802586 A | 7/2006 |
| CN | 101520904 A | 9/2009 |
| CN | 101541012 A | 9/2009 |
| CN | 101764973 A | 6/2010 |
| CN | 101893935 A | 11/2010 |
| CN | 102084391 | 6/2011 |
| CN | 102156810 A | 8/2011 |
| CN | 102194007 A | 9/2011 |
| CN | 103443817 A | 12/2013 |
| CN | 104081379 A | 10/2014 |
| CN | 104656901 A | 5/2015 |
| CN | 105787764 A | 7/2016 |
| EP | 1710717 A1 | 10/2006 |
| EP | 2015244 A1 | 1/2009 |
| EP | 2034433 A1 | 3/2009 |
| GB | 2418275 A | 3/2006 |
| JP | 11191118 A | 7/1999 |
| JP | 2001-283079 A | 10/2001 |
| JP | 2001-309323 A | 11/2001 |
| JP | 2001-344479 A | 12/2001 |
| JP | 2002-99826 A | 4/2002 |
| JP | 2003-22395 A | 1/2003 |
| JP | 2004-326229 A | 11/2004 |
| JP | 2005-337966 A | 12/2005 |
| JP | 2006-351024 A | 12/2006 |
| JP | 2007-172605 A | 7/2007 |
| JP | 2010-39908 A | 2/2010 |
| JP | 2010-141371 A | 6/2010 |
| JP | 2010-524110 A | 7/2010 |
| JP | 2011-209934 A | 10/2011 |
| JP | 2012-529685 A | 11/2012 |
| KR | 10-0805607 B1 | 2/2008 |
| KR | 10-0856585 B1 | 9/2008 |
| KR | 10-2010-0067921 A | 6/2010 |
| KR | 10-2010-0071559 A | 6/2010 |
| KR | 10-2011-0082690 A | 7/2011 |
| WO | 99/4153 A1 | 9/1999 |
| WO | WO-2008003966 A1 | 1/2008 |
| WO | 2008/051538 A2 | 5/2008 |
| WO | 2009/111047 A2 | 9/2009 |
| WO | 2009/111047 A3 | 12/2009 |
| WO | 2010/141939 A1 | 12/2010 |
| WO | 2011/070871 A1 | 6/2011 |
| WO | 2012/106096 A1 | 8/2012 |
| WO | 2013/063299 A1 | 5/2013 |
| WO | 2013/101903 A3 | 6/2014 |

OTHER PUBLICATIONS

Occipitaihq, RedLaser 2.0: Realtime iPhone UPC barcode scanning, Jun. 16, 2009, Youtube.com, http://www.youtube.com/watch?v=9_hFGsmx_6k (visited Jul. 8, 2011).*

Walther et al, Selective visual attention enables learning and recognition of multiple objects in cluttered scenes. Jun. 15, 2005.*

"U.S. Appl. No. 12/371,882, Non Final Office Action dated Jun. 8, 2011", 22 pgs.

"U.S. Appl. No. 12/406,016, Non Final Office Action dated Jun. 21, 2011", 21 pgs.

"European Application Serial No. 09717996.4, Extended European Search Report dated Feb. 17, 2011", 6 pgs.

Parker, J.R., et al., "Algorithms for Image Processing and Computer Vision", Wiley Computer Publishing, (1997), 23-29.

"U.S. Appl. No. 14/371,882, Final Office Action dated Nov. 14, 2011", 21 pgs.

"U.S. Appl. No. 12/371,882, Preliminary Amendment filed Feb. 16, 2009", 4 pgs.

"U.S. Appl. No. 12/371,882, Preliminary Amendment dated Jun. 15, 2009", 3 pgs.

"U.S. Appl. No. 12/371,882, Response filed Sep. 8, 2011 to Non Final Office Action dated Jun. 8, 2011", 13 pgs.

"U.S. Appl. No. 12/406,016 , Response filed Sep. 21, 2011 to Non Final Office Action dated Jun. 21, 2011", 17 pgs.

"European Application Serial No. 09717996.4, Response filed Aug. 16, 2011 to European Search Report dated Feb. 17, 2011", 18 pgs.

"International Application Serial No. PCT/US2009/001419, International Preliminary Report on Patentability dated Sep. 16, 2010", 5 pgs.

"U.S. Appl. No. 12/371,882, Examiner Interview Summary dated Feb. 27, 2012", 3 pgs.

"U.S. Appl. No. 12/371,882, Response filed Mar. 14, 2012 to Final Office Action dated Nov. 14, 2011", 10 pgs.

"U.S. Appl. No. 12/406,016, Final Office Action dated Feb. 29, 2012", 25 pgs.

"Korean Application Serial No. 2010-7022281, Office Action dated Feb. 28, 2012", with English Translation, KR Office Action, 13 pgs.

"U.S. Appl. No. 12/406,016, Examiner Interview Summary dated May 15, 2012", 3 pgs.

"U.S. Appl. No. 12/406,016, Response filed May 17, 2012 to Non Final Office Action dated Feb. 29, 2012", 16 pgs.

"Chinese Application Serial No. 200980107871.0, Office Action dated Feb. 2, 2012", W/English Translation, 17 pgs.

"Chinese Application Serial No. 200980107871.0, Response filed Jun. 18, 2012 to Office Action dated Feb. 2, 2012", 18 pgs.

"European Application Serial No. 09717996.4, Response filed Oct. 21, 2010", 5 pgs.

"Korean Application Serial No. 2010-7022281, Response filed Apr. 30, 2012 to Office Action dated Feb. 28, 2012", 18 pgs.

"U.S. Appl. No. 12/371,882, Examiner Interview Summary dated Nov. 20, 2012", 3 pgs.

"U.S. Appl. No. 12/371,882, Final Office Action dated Dec. 18, 2013", 26 pgs.

"U.S. Appl. No. 12/371,882, Non Final Office Action dated Aug. 30, 2013", 20 pgs.

"U.S. Appl. No. 12/371,882, Response filed Dec. 2, 2013 to Non Final Office Action dated Aug. 30, 2013", 13 pgs.

"U.S. Appl. No. 12/406,016, Non Final Office Action dated Oct. 2, 2013", 21 pgs.

"Chinese Application Serial No. 200980107871.0, Office Action dated Nov. 5, 2013", with English translation of claims, 12 pgs.

"Chinese Application Serial No. 200980107871.0, Response filed Jan. 20, 2014 to Office Action dated Nov. 5, 2013", with English translation of claims, 16 pgs.

(56) References Cited

OTHER PUBLICATIONS

"Chinese Application Serial No. 200980107871.0, Response filed Jul. 18, 2013", 12 pgs.
"European Application Serial No. 09717996.4, Examination Notification Art. 94(3) dated Jul. 23, 2013", 7 pgs.
"European Application Serial No. 09717996.4, Response filed Nov. 28, 2013 to Office Action dated Jul. 23, 2013", 15 pgs.
"U.S. Appl. No. 12/371,882, Non Final Office Action dated Oct. 23, 2012", 21 pgs.
"U.S. Appl. No. 12/371,882, Response filed Jan. 22, 2013 to Non Final Office Action dated Oct. 23, 2012", 12 pgs.
"Chinese Application Serial No. 200980107871.0, Office Action dated Nov. 1, 2012", with English translation of claims, 13 pgs.
"Chinese Application Serial No. 200980107871.0, Response filed Jan. 15, 2013 to Office Action dated Nov. 1, 2012", 13 pgs.
"Korean Application Serial No. 2010-7022281, Notice of Final Rejection dated Sep. 27, 2012", with English translation of claims, 12 pgs.
"U.S. Appl. No. 12/371,882, Final Office Action dated Mar. 13, 2013", 24 pgs.
"U.S. Appl. No. 12/371,882, Response filed Jun. 13, 2013 to Final Office Action dated Mar. 13, 2013", 14 pgs.
"Chinese Application Serial No. 200980107871.0, Office Action dated May 3, 2013", with English translation of claims, 29 pgs.
"U.S. Appl. No. 12/371,882, Examiner Interview Summary dated Apr. 27, 2016", 3 pgs.
"U.S. Appl. No. 12/371,882, Examiner Interview Summary dated Jul. 21, 2015", 4 pgs.
"U.S. Appl. No. 12/371,882, Final Office Action dated Jun. 25, 2015", 27 pgs.
"U.S. Appl. No. 12/371,882, Non Final Office Action dated Feb. 8, 2016", 37 pgs.
"U.S. Appl. No. 12/371,882, Non Final Office Action dated Mar. 12, 2015", 29 pgs.
"U.S. Appl. No. 12/371,882, Notice of Allowance dated Jul. 20, 2016", 5 pgs.
"U.S. Appl. No. 12/371,882, Response filed May 8, 2014 to Final Office Action dated Dec. 18, 2013", 12 pgs.
"U.S. Appl. No. 12/371,882, Response filed Jun. 12, 2015 to Non Final Office Action dated Mar. 12, 2015", 8 pgs.
"U.S. Appl. No. 12/371,882, Response filed Sep. 25, 2015 to Final Office Action dated Jun. 25, 2015", 13 pgs.
"U.S. Appl. No. 12/371,882,Response filed May 9, 2016 to Non Final Office Action dated Feb. 8, 2016", 14 pgs.
"U.S. Appl. No. 15/337,899, Preliminary Amendment filed Nov. 9, 2016", 8 pgs.
"Chinese Application Serial No. 200980107871.0, Decision of Reexamination dated Nov. 30, 2015", W/ English Translation, 11 pgs.
"Chinese Application Serial No. 200980107871.0, Office Action dated Jun. 5, 2014", with English translation of claims, 10 pgs.
"Chinese Application Serial No. 200980107871.0, Office Action dated Aug. 7, 2015", with English translation of claims, 23 pgs.
"Chinese Application Serial No. 200980107871.0, Response filed Sep. 22, 2014", with English translation of claims, 18 pgs.
"Chinese Application Serial No. 200980107871.0, Response filed Sep. 22, 2015 to Office Action dated Aug. 7, 2015", with English translation of claims, 16 pgs.
"Korean Application Serial No. 2010-7022281, Trial Board Decision mailed Mar. 25, 2014", with English machine translation, 21 pgs.
"European Application No. 09717996.4, Summons to Attend Oral Proceedings mailed Nov. 28, 2016", 9 pgs.
U.S. Appl. No. 15/337,899, filed Oct. 28, 2016, Identification of Items Depicted in Images.
"Indian Application Serial No. 6557/DELNP/2010, First Examiner Report dated Apr. 11, 2017", 11 pgs.

Wikipedia, "Definition of Homogeneous Coordinates", Retrieved from the Internet URL: <https://web.archive.org/web/20110305185824/http://en.wikipedia.org/wiki/Homogeneous_coordinates>, Mar. 5, 2011, 8 pages.
Wikipedia, "Polar Coordinate System", Retrieved from the Intent URL: <http://en.wikipedia.org/wiki/Polar_coordinate_system>, Oct. 8, 2011, 12 pages.
mlb.com "MLB At Bat 11", Retrieved from the Internet: <URL: https://www.mlb.com/apps/atbat>, Accessed on Apr. 19, 2018, pp. 1-6.
"SnapTell: Technology", Retrieved from the Internet: <URL: http://web.archive.org/web/20071117023817/http://www.snaptell.com/technology/index.htm>, Nov. 17, 2007, 1 page.
Extended European Search Report received for European Patent Application No. 17171025.4, dated Sep. 4 2017, 7 pages.
Response to Extended European Search Report filed on Apr. 26, 2018 for European Patent Application No. 17171025.4, dated Sep. 4, 2017, 19 pages.
Response to First Examiner Report filed on Sep. 25, 2017 for Indian Patent Application No. 6557/DELNP/2010, dated Apr. 11, 2017, 11 pages.
Gonsalves, "Amazon Launches Experimental Mobile Shopping Feature", Retrieved from the Internet: <URL: http://www.informationweek.com/news/internet/retail/showArticle.jhtml?articleID=212201750&subSection=News>, Dec. 3, 2008, 1 page.
Kraft, "Real Time Baseball Augmented Reality", Retrieved from the Internet URL: <http://dx.doi.org/10.7936/K7HH6H84>, Washington University in St. Louis, 2011, 11 pages.
Mello, "Pongr Giving Cell Phone Users Way to Make Money", Retrieved from the Internet URL; <https://www.pcworld.com/article/240209/pongr_giving_cell_phone_users_way_to_make_money.html>, Sep. 18, 2011, 4 pages.
Mulloni et al., "Handheld Augmented Reality Indoor Navigation with Activity-Based Instructions", Proceedings of the 13th International Conference on Human Computer Interaction with Mobile Devices and Services, Aug. 30-Sep. 2, 2011, 10 pages.
International Search Report received for PCT Application No. PCT/US2009/001419, dated Sep. 30, 2009, 4 pages.
International Written Opinion received for PCT Application No. PCT/US2009/001419, dated Sep. 30, 2009, 8 pages.
Terada, "New Cell Phone Services Tap Image-Recognition Technologies", Retrieved from the Internet: <URL: http://search.japantimes.co.jp/cgi-bin/nb20070626a1.html>, Jun. 26, 2007, pp. 1-3.
Troaca, "S60 Camera Phones Get Image Recognition Technology", Retrieved from the Internet: <URL: http://search.japantimes.co.jp/cgi-bin/nb20070626a1.html>, Feb. 27, 2008, pp. 2.
Vassilios et al., "Archeoguide: An Augmented Reality Guide for Archaeological Sites", IEEE Computer Graphics and application vol. 22, No. 5, Sep./Oct. 2002, pp. 52-60.
Vlahakis et al., "Archeoguide: First Results of an Augmented Reality, Mobile Computing System in Cultural Heritage Sites", Jan. 2001, 10 pages.
U.S. Appl. No. 13/050,769, filed Mar. 17, 2011 now U.S. Pat. No. 8,868,443, Targeted Incentive Actions Based on Locations and Intent.
U.S. Appl. No. 13/339,235, filed Dec. 28, 2011, Targeted Incentive Actions Based on Location and Intent.
U.S. Appl. No. 14/512,350, filed Oct. 10, 2014, Targeted Incentive Actions Based on Location and Intent.
U.S. Appl. No. 14/486,518, filed Sep. 15, 2014, Targeted Incentive Actions Based on Location and Intent.
"U.S. Appl. No. 15/337,899, First Action Interview—Pre-Interview Communication dated Mar. 19, 2019"6 pgs.
Office Action Received for Chinese Patent Application No. 201610108229.6 dated Nov. 15, 2018, 15 pages (6 pages Official Copy and 9 pages English Translation).
Office Action received for Chinese patent Application No. 201610108229.6, dated May 17, 2019, 33 pages (20 pages of English Translation and 13 pages of Official copy).
U.S. Appl. No. 16/406,787 filed May 8, 2019, Method and Apparatus for Image Recognition Services.

(56) References Cited

OTHER PUBLICATIONS

"Chinese Application Serial No. 201610108229.6, Response filed Apr. 1, 2019 to Office Action mailed Nov. 15, 2018", (w English Claims), 31 pages.

Decision of Rejection Received for Chinese Patent Application No. 201610108229.6, dated Mar. 26, 2020, 11 pages (7 pages of Official Copy & 4 pages of English Translation of Claims).

Response to Office Action filed on Feb. 28, 2020 for Chinese Patent Application No. 201610108229.6, dated Dec. 17, 2019, 8 pages (4 pages of official copy & 4 pages of English Translation of claims).

Final Office Action received for U.S. Appl. No. 15/337,899 dated Nov. 14, 2019, 20 pages.

Non-Final Office Action received for U.S. Appl. No. 15/337,899 dated Feb. 5, 2020, 11 pages.

Response to Final Office Action filed on Jan. 13, 2020 for U.S. Appl. No. 15/337,899, dated Nov. 14, 2019, 15 Pages.

Response to First Action Interview Office Action Summary filed on Sep. 06, 2019, for U.S. Appl. No. 15/337,899, dated Jun. 25, 2019, 14 Pages.

Communication Pursuant to Article 94(3) EPC received for European Patent Application No. 17171025.4, dated Feb. 7, 2020, 6 pages.

Office Action received for Chinese Patent Application No. 201610108229.6, dated Dec. 17, 2019, 23 Pages (9 pages of Official Copy and 14 pages of English Translation).

Response to Office Action filed on Oct. 8, 2019, for Chinese Patent Application No. 201610108229.6, dated May 17, 2019, 17 pages (13 pages of Official Copy & 4 pages of English Pending Claims).

* cited by examiner

RESULTS 153

| IMAGE | IMAGE | IMAGE | IMAGE | IMAGE |
|---|---|---|---|---|
| 1ST EDITION HARRY POTTER HARDCOVER 9.99 0 2008-02-27T23:59:54.000Z | HARRY POTTER AND THE SORCERER'S STONE 1ST ED MINT COND. 49.99 0 2008-20-28T18:00:15.000Z | HARRY POTTER AND THE SORCERER'S STONE BY ROWLING HC, DJ 6.99 0 2008-02-28T21:46:31.000Z | 6TH PTG NO # SPINE! HARRY POTTER SORCERER'S STONE HB 174.95 0 2008-02-29T01:29:09.00Z | HARRY POTTER AND THE SORCERER'S STONE BY J.K. ROWLI... 0.99 1 2008-02-29T01:47:47.000Z |

151 — ISBN 0590353403
9 780590 353403

*FIG. 9*

METHOD AND APPARATUS FOR IMAGE RECOGNITION SERVICES

CROSS-REFERENCE TO RELATED APPLICATION

The present application is based on a provisional application entitled "IMAGE RECOGNITION AS A SERVICE," Ser. No. 61/033,940, filed on Mar. 5, 2008, the benefit of the filing date of which is claimed under 35 U.S.C. § 119(e) and the content of which is incorporated herein in its entirety

BACKGROUND

As the interconnectivity provided by networked communications and mobile communications increases, such technologies become more and more a part of everyday business operations and personal consumption activities. There is, therefore, a need for efficient, flexible communications, incorporating textual information and operational information, as well as video and audio information.

There is a need for a flexible mechanism for allowing users to search and identify items for consumption, particularly in the area of content retrieval. In this context, consumption includes economic transactions, social transactions and business transactions.

In one example, a commerce service operating in a networked computing environment provides users with a forum for buying and selling goods and services on the Internet. In order to provide users with an optimum experience, the commerce service develops features to aid users in the buying and selling of goods and services. Such features include, but are not limited to, the use images in identifying items by both sellers and buyers. The use of images is important because it allows users to see the actual item they are looking to purchase from the seller.

The use of images has been traditionally limited to sellers providing detailed information advertising an item for sale, wherein the detailed information includes a photograph, drawing, video or other image of the product.

BRIEF DESCRIPTION OF THE DRAWINGS

FIGS. 8 and 9 are process flow diagrams illustrating image input content provided to an image processing unit as a request for image services, and the resultant information provided in response, according to example embodiments;

DETAILED DESCRIPTION

Figure 1:
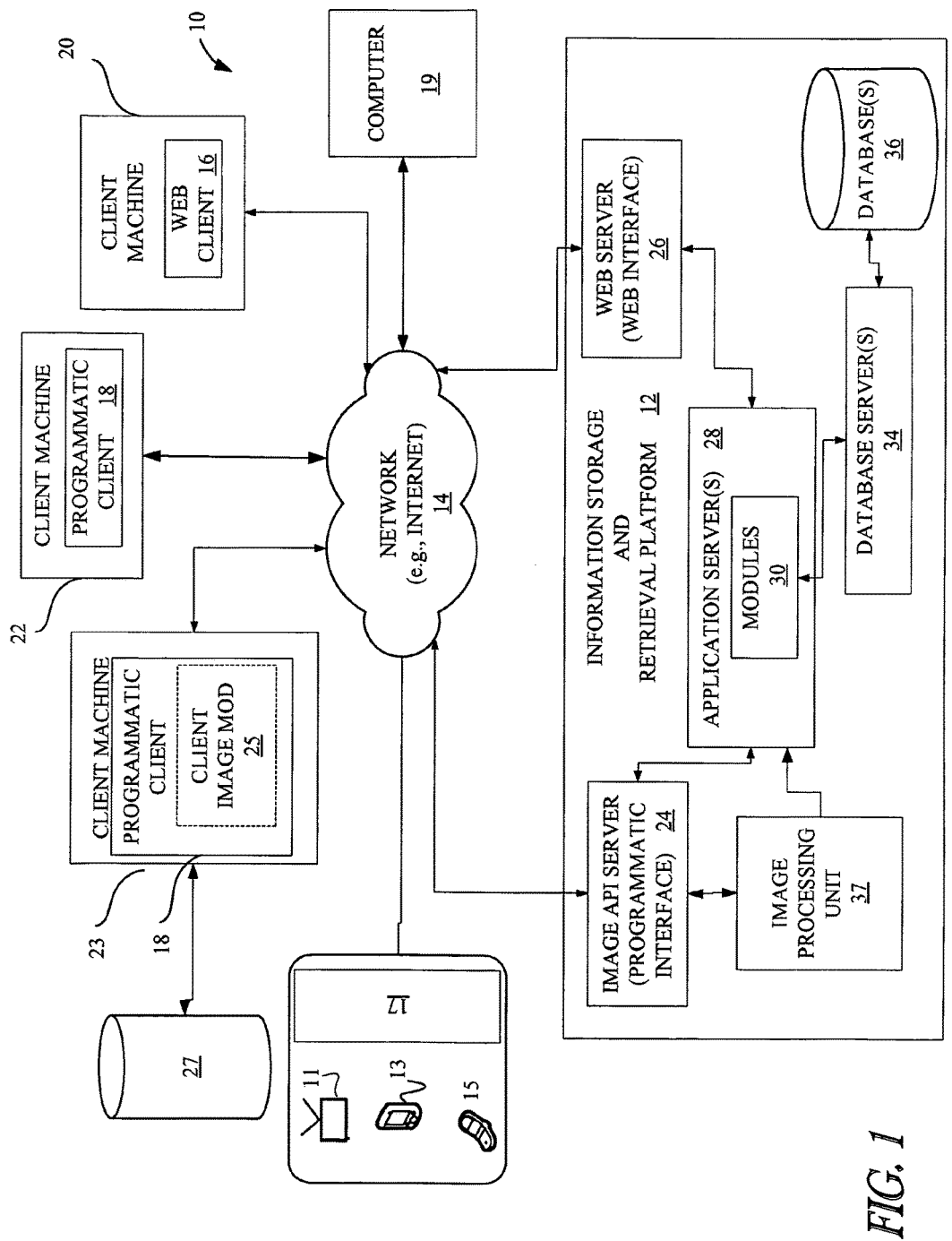
FIGS. 1 and 2 are block diagrams illustrating a system having a client-server architecture and for providing image services, according to an example embodiment.

In the following description, for purposes of explanation, numerous specific details are set forth in order to provide a thorough understanding of some example embodiments. To one skilled in the art, it is evident that the concepts presented herein may be practiced without these specific details.

Methods and systems to enhance search capabilities in a network accessible information resource including generation of a data dictionary to identify data items stored in the information resource are described.

According to an example embodiment, there is provided a system having the benefits of advanced image services within a publication system (e.g., a transaction platform, such as an ecommerce platform or site). A part of the system is responsible for the provision of image services in the environment oriented towards mobile phone technology. According to one example embodiment, taking a picture of an item and sending a particularly formatted email to an address associated with an ecommerce site results in retrieval of relevant items from an ecommerce database. In one embodiment, a response email is generated which has a look and feel consistent with an ecommerce mobile web site. The system is flexible and allows third-party developers to take full advantage of image services, such as searching through ecommerce listings for similar images and items with particular barcodes using simplified interface calls. The system is extensible allowing the addition of more services or modifications to the existing ones.

For example, in one embodiment, the system may be employed to automatically generate a publication (e.g., a fixed price or auction listing) for an item or service based on an image (e.g., a picture of a product or other identifying information associated with a product, such as a barcode, Vehicle Identification Number (VIN) or title) when the image is transmitted to a publication system. In this example, the image may be utilized to identify and retrieve additional information to create a publication. In this way, methods and apparatus for image recognition services are used to generate listings for sale by a seller, as well as to search and identify items for purchase by a user. Developers directed toward either side of a transaction may apply such techniques to generate listings and to locate items. In one example, a bulk user of an ecommerce system uploads information related to a plurality of image-based items, which is collated, organized, and compared to information in item databases. In response, a plurality of items is retrieved corresponding to the plurality of image-based items. Certain default assumptions may be made with respect to the publication and may also be included within the publication as publication data. For example, a certain price may be automatically associated with a product that is advertised for sale in the listing, based on the pricing of similar or comparable items that are currently being offered for sale, or that have been sold in the past via a transaction platform supported by a publication system.

In a further example embodiment, the system may be employed in a fraud prevention function to automatically provide an indication as to whether a particular item is a genuine or fraudulent item, based on a comparison of an image, e-mailed or otherwise transmitted to the system, with a stored collection of images of either genuine or fraudulent items. Certain features of an item may be flagged within the system for particular scrutiny and as being particularly indicative of whether an item is fraudulent or genuine. In one example, a user receives an advertisement or offer to purchase a product for a given price. The user desires confirmation of the legitimacy of the advertisement or offer and sends an image received in the advertisement or offer to a known seller for confirmation.

One example embodiment of a distributed network implementing image recognition services for identifying data items stored in an information resource is illustrated in the network diagram of FIG. 1 which depicts a system 10 using a client-server type architecture. A commerce platform or commerce server includes an information storage and retrieval platform 12, which provides server-side functionality, via a network 14 (e.g., the Internet) to one or more clients. As illustrated, a system 10 interacts with a web client 16 executing on a client machine 20, a programmatic client 18 executing on a client machine 22, and, a programmatic client 18 in the form of client image modules 25 executing on a client machine 23. In one embodiment, web client 16 is a web browser, but may employ other types of web services.

Within the information the storage and retrieval platform 12, Application Program Interface (API) server 24 and web server 26 are coupled to, and provide programmatic and web interface to, one or more application servers 28. Application servers 28 host one or more modules 30 (e.g., modules, applications, engines, etc.). Application servers 28 are, in turn, shown to be coupled to one or more database servers 34 that facilitate access to one or more databases 36. Modules 30 provide a number of information storage and retrieval functions and services to users accessing the information storage and retrieval platform 12. A user accesses information storage and retrieval platform 12 through network 14.

While system 10 of FIG. 1 employs a client-server architecture, the present disclosure is not limited to this architecture, and could be applied to a distributed, or peer-to-peer, architecture system. The various modules 30 and may also be implemented as stand-alone software programs, which do not necessarily have networking capabilities.

The web client 16 may access the various modules 30 via a web interface supported by web server 26. Web server 26 allows developers to build web pages. In one embodiment, web server 26 is used in collaboration with Java® technologies by Sun Microsystems of Menlo Park, Calif., and with Ajax (Asynchronous JavaScript and XML) technologies, which is a collection of technologies enabling the creation of web applications. Ajax uses JavaScript, eXtensible Markup Language (XML), Cascading Style Sheet (CSS) formatting, along with a few other technologies. Ajax allows programmers to refresh certain parts of a web page without having to completely reload the page. By obtaining information dynamically, web pages load faster, respond more quickly to requests, and are more functional. Developers consider using Ajax applications, and Ajax-like applications, when seeking to reduce network latency in certain applications.

Similarly, programmatic client 18 accesses various services and functions provided by the modules 30 via the programmatic interface provided by the API server 24. In one example, programmatic client 18 is a seller application (e.g., the TurboLister® application developed by eBay Inc., of San Jose, Calif.) enabling sellers to author and manage data item listings, with each listing corresponding to a product or products, on information storage and retrieval platform 12. Listings may be authored and modified in an off-line manner such as when a client machine 20, 22, or 23 is not necessarily connected to information storage and retrieval platform 12. Client machines 20, 22 and 23 are further to perform batch-mode communications between programmatic clients 18 and 25 and information storage and retrieval platform 12. In addition, programmatic client 18 and web client 16 may include authoring modules (not shown) to author, generate, analyze, and publish categorization rules used in information storage and retrieval platform 12 to structure data items and transform queries. In one example embodiment, transforming queries uses a data dictionary with token pairs to expand a narrow keyword or to focus a broad keyword. The client machine 23 is further shown to be coupled to one or more databases 27. The databases 27 include information used by client machine 23 in implementing a service or operation and may include specific information for products or services offered by client machine 23.

Users having access to service(s) provided by client machine 23, for example, include users of computer 19 and users of wireless network 17, which may serve as a common access point to Internet 14 for a variety of wireless devices, including, among others a cable type television service 11, a Personal Digital Assistant (PDA) 13, and a cellular phone 15.

In one example, client machine 23 enables web services, wherein a catalog of web services is stored in information storage and retrieval platform 12. Client machine 23 stores information related to use of the web services in databases 27, wherein the information is used to identify associated services and offerings. The associated services and offerings are also listed in the catalog of web services. Descriptors of the associated services and offerings may be used to generate and modify a vocabulary for a data dictionary corresponding to the catalog of web services, such that a user search having keywords related to a first service may return results for a second service associated with the first service. Additionally, each of client machines 20, 22 and 23 may also be users that search data items in information storage and retrieval platform 12.

In another example, client machine 23 is an ecommerce client offering products to customers via Internet 14. Client machine 23 stores a catalog of products in information storage and retrieval platform 12, with the catalog of products having a corresponding data dictionary. Client machine 23 stores information related to at least one product in databases 27. The information may include frequency of searches, resultant sales, related products, pricing information, and other information related to customer use of the ecommerce service. Additionally, databases 27 may store other product related information, such as style, color, format, and so forth. Client machine 23 may use the information stored in databases 27 to develop descriptor information for at least one product. Product descriptors and other product information may be used to generate and modify a vocabulary for a data dictionary corresponding to the catalog of products, such that a user search having keywords related to a first product may return results for a second product associated with the first service. In other embodiments, a client machine may store information in information and storage retrieval platform 12 related to business processes, or other applications which store data in a database which may be accessed by multiple users. A common problem in such systems is the ability to understand and anticipate multiple users' keywords entered in search queries as search terms. Each of the multiple users may use different keywords to search for a same data item. The use of a data dictionary corresponding to data items enhances a search mechanism in returning the same data item to different users resulting from searches on different keywords.

To facilitate search within information storage and retrieval platform 12, image processing unit 37 provides image processing services, including image recognition of data received from a client machine and image compression processing. The image processing unit 37 may operate on information received from client machines 20, 22, and 23, such as product or service descriptor information, as well as other information related thereto. Image processing unit 37 processes this information to compare received information to stored data for items, such as barcode information of an item or a photograph or other image found outside of system 10. The image processing unit 37 may further provide data compression to reduce the size of received information to facilitate storage, further processing, and transfer of information to another entity. The image processing unit 37 also aids in searching data items stored in databases 36, by matching the received information to known data. Such comparison and matching may use any of a variety of techniques. Further, the received information is similar to search query information, which is traditionally entered as textual information or by selection of categories presented to a user. The image processing unit 37 allows the system 10 to handle image based queries.

In one embodiment, the received image information corresponds to data item information (e.g., product information). In addition, the received image information may correspond to non-specific items, such as to a category of items, which are identified and then presented to the requester.

Where the quality of a search mechanism (e.g., a search engine) to search an information resource is measured by the ability to return search results of interest to the user (e.g., search requester) in response to a search query, image processing unit 37 dramatically expands the type of information and specificity of information a requester may submit as the subject of a search. For example, a search mechanism may respond to a query from a user with search results that contain data items covering a spectrum wider than the interests of the user. Traditionally, the user may then experiment by adding additional constraints (e.g., keywords, categories, etc.) to the query to narrow the number of data items in the search results; however, such experimentation may be time consuming and frustrate the user. To this end, the use of image information in many cases provides an exact, and often unique, identification of the desired item.

Figure 2:
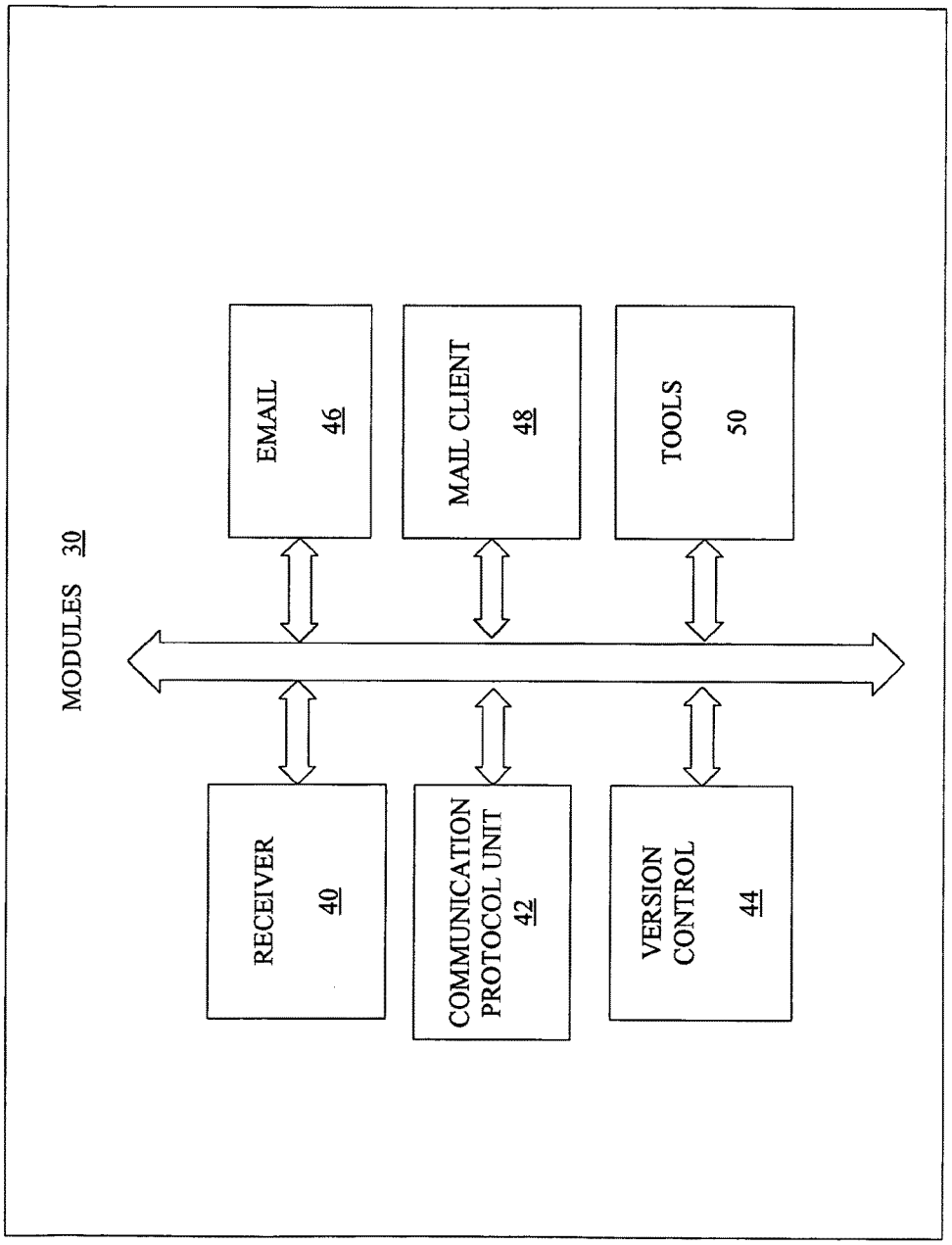

Continuing with system 10 of FIG. 1, information storage and retrieval system 12 includes modules 30 within application server(s) 28, wherein modules 30 is further detailed in FIG. 2. The modules 30 may include software modules or functionality of a module implemented at least partially in software. The software may be developed using a flexible programming language, such as Java. Java® is an object-oriented programming language developed by Sun Microsystems. Other languages and development tools may be used according to the design and purpose and at the discretion of the system developer.

As illustrated, modules 30 include a receiver 40 to receive images and other information from entities within system 10, such as through network 14. Further included within modules 30 is communication protocol unit 42, to receive, process and transmit messages according to one or multiple communication protocols. In one example, communication protocol unit 42 processes GET-POST messages. In this example, a Hypertext Transfer Protocol (HTTP) is used to publish and retrieve text pages on the Internet. HTTP now allows users to generate numerous requests to perform a wide variety of tasks. For instance, it is possible to generate a request to obtain the meta-information of some file located on a remote server. The two fundamental request types of HTTP are GET and POST. The GET request encodes data into a Uniform Resource Locator (URL), while a POST request appears in a message body. The URL identifies a location of a participant in an HTTP communication. Typically GET requests involve retrieving or "getting" data, and a POST request is not so limited, applying to storing data, updating data, sending an email, ordering a product or service.

GET requests embed the parameters of requests in the URL as parameter-value pairs. An example of the resulting URL is provided as:

HTTP://www.site.com/get.cgi?name=John&zip=012345.

POST requests require additional space in the request itself to encode the parameters. The additional space is well used when a large number of parameters or the values are desired or required, but such a large number of parameters are too voluminous to be embedded directly into a URL. For example, a POST request is used when transferring contents of a file from a browser to a server.

Continuing with FIG. 2, an email module 46 and a mail client 48 are also included. The email module 46 provides an email application for use by the system for interacting with clients. Email protocols are methods used to both send and receive email messages. The Post Office Protocol (POP) protocol provides a simple and standard way for users to download email messages from a remote server over a Transmission Control Protocol (TCP)/Internet Protocol (IP) type Internet connection. Similarly, the Simple Mail Transfer Protocol (SMTP) protocol is a protocol that allows for transferring email messages over the Internet. Each message sent over the SMTP protocol can contain multiple recipients and various text data, as well as other encoded objects. These encoded objects may include images, documents, and so forth.

A mail client 48 allows communications from within other applications, such as ecommerce applications. In this way, when an issue arises during operation of the application, the application is able to send information directly to the current user of the application. Further, users are provided with a way to communicate directly with the application. In one example, mail client 48 is used to implement a chat session between a representative of the application and a user of the application. The representative may be an automated or robotic representative, pre-programmed to respond to a variety of communications. Module 30 further includes version control 44 and tools 50. Version control 44 allows programmers to keep files in a central location, allowing all programmers on a given project to simultaneously work on a set of code. In one example, Concurrent Versions System (CVS) version control software is used to track changes and allow for reversion to previous states of files.

The tools unit 50 provides developer tools and software for building applications, such as to expand or enhance the image processing capabilities. In one example, tools 50 include Java servlets or other programs to run on a server. As the present example implements Java tools, some terms used with respect to Java applications and tools are detailed. A Java applet is a small program sent as a separate file along with an HTML communication, such as a web page. Java applets are often intended to run on a client machine and enable services. Java applet services, for example, may perform calculations, position an image in response to user interaction, process data, and so forth.

In a networked computing system, some applications and programs are resident at a central server, including those enabling access to databases based on user input from client machines. Typically, such applications and programs are implemented using a Common Gateway Interface (CGI) application. When Java applications are running on the server, however, these applications and programs (i.e. Java servlets) may be built using Java programming language. Java servlets are particularly useful when handling large amounts of data and heavy data traffic, as they tend to execute more quickly than CGI applications. Rather than invoking a separate process, each user request is invoked as a "thread" in a single process, or daemon, reducing the amount of system overhead for each request.

Instead of a URL to designate the name of a CGI application, a request to call a Java servlet is given as:
HTTP://www.whatis.com: 8080/servlet/gotoUrl?HTTP://www.someplace.com
wherein the "8080" port number in the URL sends the request directly to the web server. The "servlet" indication within the URL indicates to the web server that a servlet is requested.

Java servlet technology enables developers to generate web content on the fly. For example, Apache Tomcat is an application server which may be used to deploy and test Java servlets. Application server(s) 28 wait for HTTP requests and run appropriate portions of Java servlets responsible for handling GET or POST requests as received. Java methods generate responses which are in turn transferred by application server(s) 28 to a client using HTTP communications. The responses generally consist of plain text data, using HTML or XML tags, but may be used to transfer non-plain text files such as images and archives.

XML is a markup language allowing a user to define custom tags to describe data for any domain. It is mostly used to exchange information across different systems via the Internet. XML documents are used for the structure, storage, and transportation of various types of data. An XML element contains a start and end tag, and all of the information contained within, which can be either more XML elements or text data. The following is an example of an XML document:

```
<?xml version="1.0"?>
    <Staff>
        <Employee>
            <Name> John</Name>
            <Salary>1000</Salary>
        </Employee>
        <Employee>
            <Name> Mike</Name>
            <Salary>5000</Salary>
        </Employee>
    </Staff>
``` wherein the <Staff> element contains two employee elements, and each <Employee> tag contains various descriptions of each employee, including his name and salary, contained in the <Name> and <Salary> tags. In this example, an XML file may be used to store and transport information on the staff of a company.

Other tools include various development applications. In one example, an Integrated Development Environment (IDE), such as Eclipses by the Apache Software Foundation, is used to develop Java software. Additionally, plug-ins may be written for the Eclipse platform to expand development capabilities and allow the use of other programming languages.

Figure 3A:
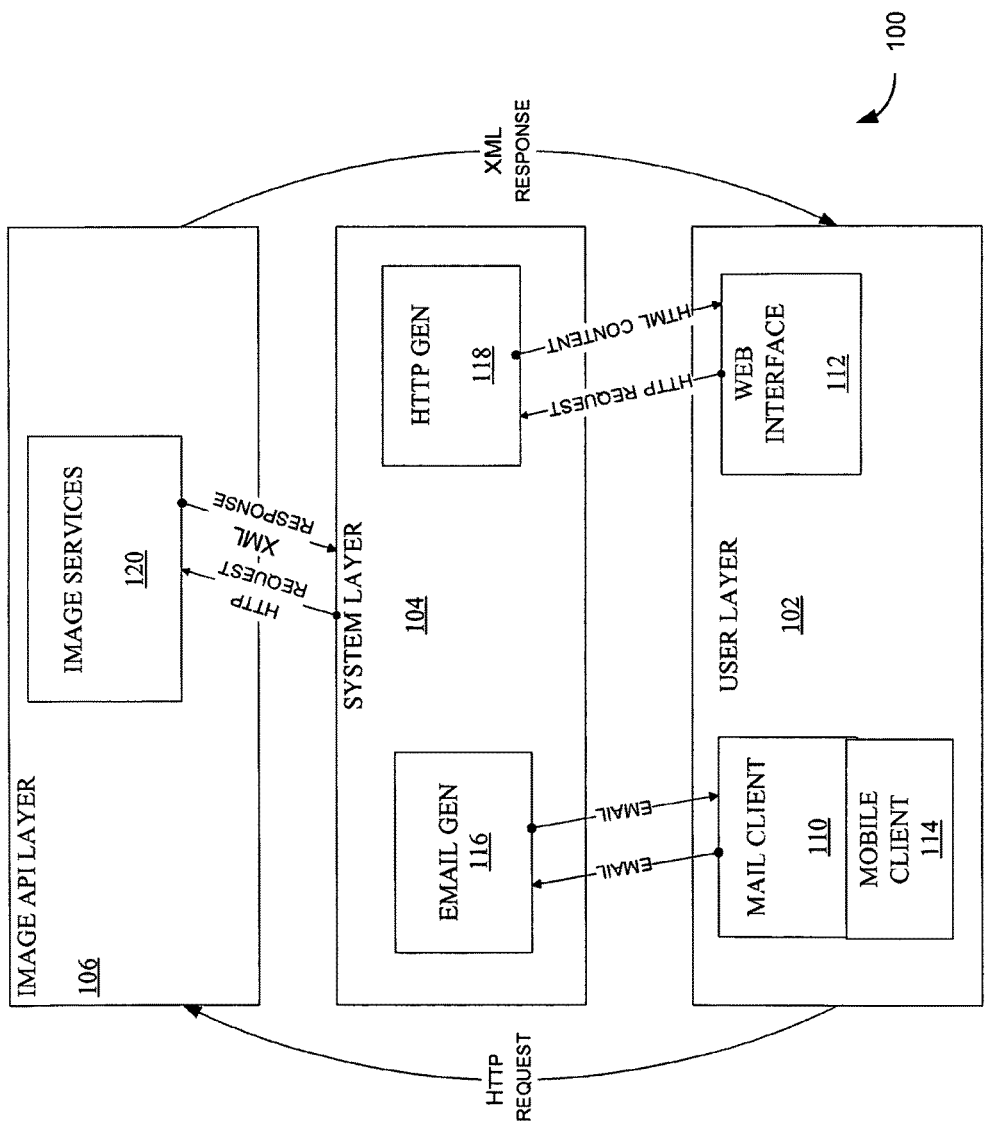
FIGS. 3A and 3B are block diagrams illustrating functional layers within a system for providing image services, according to an example embodiment.

An example design of a system 100, similar to system 10, is illustrated in FIG. 3A having three layers: user layer 102, system layer 104, and image API layer 106. User layer 102 includes mail client 110, mobile client 114, and web interface 112. Each module provides functionality and communication processing. System layer 104 includes an email generator 116 and an HTML generator 118. Note, alternate embodiments may implement other communication protocols, and HTML is provided here as one example. Additionally, HTML generator 118 may further be to implement more than one communication or transfer protocol. Image API layer 106 includes image services 120. The various layers 102, 104, 106 communicate according to predetermined relationships and agreed communication protocols.

In one example, user layer 102 of system 100 is an end-user application that uses an application from system layer 104 or directly communicates with image API layer 106. The main components of user layer 102, according to the present example, include an email interface using a mobile phone interface, such as Apple iPhone® by Apple of Cupertino, Calif., and a web interface using a standard web browser. The email interface using the Apple iPhone consists of using a combination of the integrated camera and the native email and web applications to email attached images to system layer 104. The Apple iPhone then receives an email back containing the results of the request. The web interface allows a user to upload a file, select a function to perform, and/or select a search category. The request is then sent directly to image API layer 106, and the browser receives an XML response indicating search/match results.

As illustrated, mail client 110 and mobile client 114 of user layer 102 send and receive email to email generator 116 of system layer 104. Current mobile phone models (such as the Apple iPhone) allow users to do a wide variety of tasks in addition to simply making phone calls and sending Short Messaging Service (SMS) messages. These tasks include, but are not limited to, taking pictures, listening to music, sending and receiving email, watching videos, browsing the internet, and others. While many mobile phones contain these features, many of the features are scaled down from their computer counterparts to function properly within a mobile phone environment. Considerations for applying features to a mobile phone include slower processors, lower bandwidth, and smaller screens. Due to these limitations, many services available to online computer users must be scaled down to work properly with mobile devices. This can be done by creating web pages with lower bandwidth requirements or by scaling down the size of text and images to fit on smaller screens. In order to take full advantage of this mobile domain, systems are to be designed with a mobile audience in mind.

Continuing with FIG. 3A, web interface 116 of user layer 102 sends HTTP requests to HTML generator 118 of system layer 104. In response, HTML generator 118 sends HTML content to web interface 116. Web interface 116 is a user interface, such as a Graphical User Interface (GUI), for communication with various applications.

User layer 102 also communicates with image API layer 106 by sending an HTTP request; an XML response is then sent from image API layer 106 to user layer 102. When user layer 102 sends a request for image processing directly to image API layer 106, the request is sent in a format specific to the API of image API layer 106. In this way, image services 120 is able to understand the requested service and is able to retrieve the image data on which the service is to be performed. For such direct communication, formatted data is added to the image data. In effect, a wrapper is placed on the image data providing sufficient information to image services 120 to retrieve the image data and process according to the request.

System layer 104 enables a user-friendly interface to image API layer 104 by receiving messages, such as emails and HTTP requests, from user layer 102, translating the received messages into a format for image API layer 106, and may also perform initial processing of the image data included therewith. In one embodiment, image API layer 106 receives HTTP requests from system layer 104 and again responds with XML responses, however, alternate communication protocols may be implemented. As an interface, translation and processing layer, system layer 104 facilitates easy communication and increases efficiency by receiving information in a variety of formats from user layer 102. System layer 104 thus allows user layer 102 to make multiple calls in a reduced amount of time. Additionally, system layer 104 allows for parallel processing of requests and bulk uploading of batches of image objects. In the examples provided, system layer 104 receives information, including image data or image objects, in a message. Alternate communication protocols and techniques may be implemented as well.

Upon receiving image data from layer 102, system layer 104 then packages the image data in a wrapper and sends the wrapped image data to image services. The wrapper provides processing instructions to image services 120. Processing instructions may include a selection of one of a plurality of services offered by image services 120, such as for reading a barcode or for OCR of an image object. In one embodiment, processing instructions provide further details as to how to process the image data. For example, processing instructions may specify a resolution desired or a specific technique to apply in processing the image data. In an alternate embodiment, processing instructions are provided in additional messaging separate from the image data request, wherein an identifier is used to correspond the processing instructions to the image data.

In one example, when user layer 102 sends a message to system layer 104 requesting image processing services, system layer 104 applies a set of rules to the received message. The rules providing guidance as to how to process the received message. The rules may instruct system layer 104 to parse the message to retrieve the image data or image object. The rules may further instruct system layer 104 on how to identify a type of information contained in the message as well as how to identify image processing instructions. Additionally, system layer 104 may attach additional information to the image data before formatting and sending to image API layer 106.

By acting as a liaison between user layer 102 and image API layer 106, system layer 104 maintains a consistent communication between user layer 102 and image services 120, as the image API layer may change due to upgrades, enhancements or implementation of a different communication protocol, while the user layer 102 is able to continue using a same format for image processing requests. In this way, the communication platform between system layer 104 and image API layer 106 may change without changing the interface between user layer 102 and system layer 104.

Image API layer 106 connects user layer 102 or system layer 104 to various image services, such as those of image processing unit 37. Image API layer 106 is accessed through HTTP requests and responds using XML files. Image API layer 106 executes various image services in response to received requests. Additionally, each XML response varies depending on the image service selected by a user or by image API layer 106.

Image API Layer 106 and image processing unit 37 in combination provide Optical Character Recognition (OCR) and image comparison services. OCR is a field in computer science that deals with converting visually represented textual information (scanned images, photographs, etc.) to a workable computer format. OCR service may be to extract text from an image and/or to extract barcode data from an image. An image comparison service receives an image and returns a set of URLs for other images similar to the received image.

Image API layer 106 provides an interface to various image services and allows a service to connect to the image services through HTTP GET and POST calls and receive an XML response. In addition, system 100 handles email communications designed to receive a user email having an attached or included image, initiate image processing and respond to the user. The user may specify the specific processing requested, or may simply supply an image or set of images as a search query.

System layer 104 includes applications to connect users to image API layer 106, such that in many instances user layer 102 avoids direct interface with image API layer 106. System layer 104 processes requests from user layer 102, forwarding the request to image API layer 106. System layer 104 then receives XML responses from image API layer 106, parses the data and formats it in a way that can be handled by user layer 102. This allows for a more robust formatting of the data, ensuring that user layer 102 does not have to receive and format all of the data directly from the API layer.

The system layer 104 includes a content generator for email, which receives an email sent to a dedicated address, creates an HTML-based email response, and sends it back to the user's email address.

The image API layer 106 is an application interface to image processing unit 37 of FIG. 1. As discussed above, image processing includes comparison processing to take in an image file and metadata (e.g., an item category) and return a set of images similar to the received image. In one example, comparison is based on color, shape, and texture, and is able to compare a given image to a pre-hashed set of images from a small set of categories. Example categories may include: women's bags, women's clothing, and shoes.

The system includes Java implemented image comparison algorithms. An example embodiment considers three product categories (e.g., clothing, shoes, and bags) and uses shape, texture and color to determine a similarity distance between a given image and each of multiple pre-hashed images stored in a database. The similarity distance identifying a number of same characteristics or parameters of the received image data or image object and those stored in a same or similar category in a product database. The similarity distance calculation may weight one of these characteristics or parameters more heavily than others. After determining a similarity distance, the resultant retrieved set of images with similar features is sent back as a report. The example embodiment incorporates Java code for image comparison for an image API of image API layer 106.

Figure 3B:
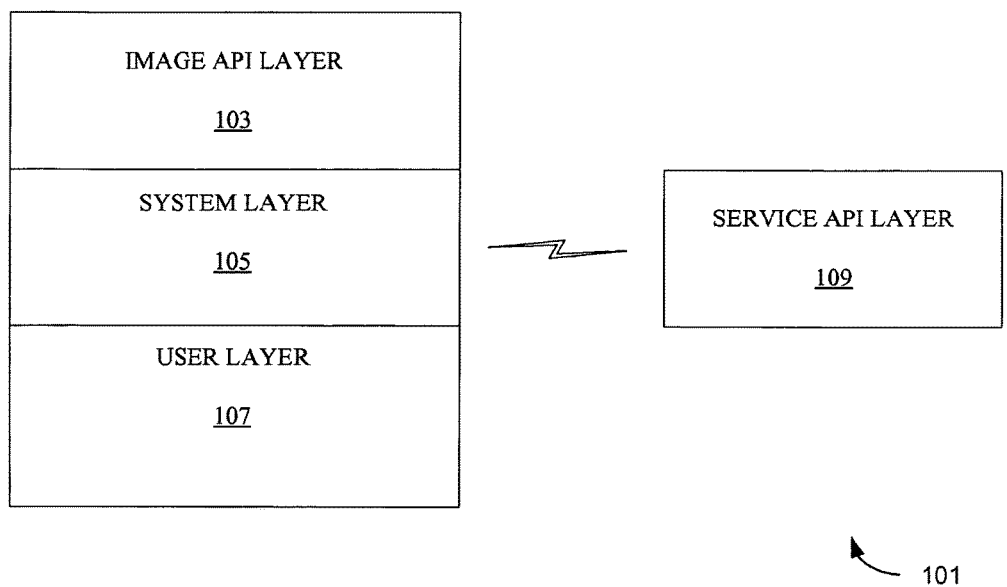

As illustrated in FIG. 3A, the three layers: user layer 102, system layer 104, and image API layer 106, communicate with each other to facilitate image processing according to configurations and embodiments supporting a variety of systems and services. The various layers may be distributed in a system, such as system 10, or may be combined and configured together in one or more units. FIG. 3B illustrates an alternate embodiment for a system 101, wherein user layer 107, system layer 105 and image API layer 103 are resident within a client device, such as a computing device or a mobile device. The image API layer 103 functions in a similar manner to image API layer 106, including image processing functionality in addition to providing an API for communication. The three layers: user layer 107, system layer 105, and image API layer 103, further communicate with a service through a service API layer 109. The service may be an ecommerce service, a business service, a distributed computing network service, a mobile service or so forth. In this way, images provided by user layer 107 are processed for accessing a service through service API layer 109.

In one embodiment, the service is an ecommerce auction based service, wherein a user enters product image information, such as a bar code or photograph, through image API layer 103. The image information is processed within image API layer 103, and provided to service API layer 109 through a networked communication. In another similar embodiment, the image information is emailed to a server accessed through service API layer 109, wherein the email includes processed image information. A response from service API layer 109 may be sent directly, such as using an Internet Protocol (IP) communication, or by email to an email address associated with one of image API layer 103, system layer 105, and user layer 107.

Figure 4:
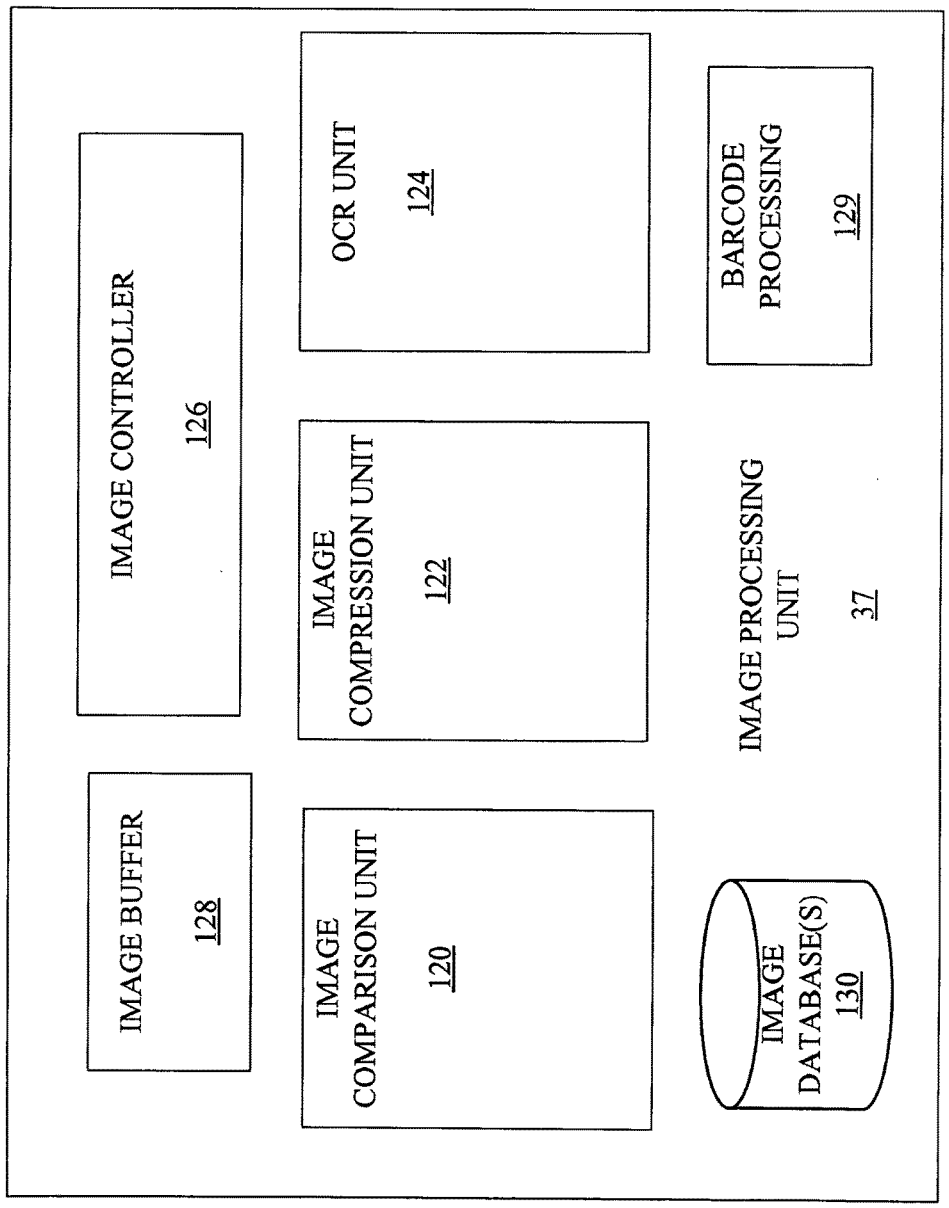
FIG. 4 is a block diagram illustrating an image processing unit within a system for providing image services, according to an example embodiment.

An example of image processing unit 37 is illustrated in FIG. 4. Included are image comparison unit 120, image compression unit 122, and OCR unit 124. An image controller 126 receives user selections and requests, and an image buffer 128 stores image files. The image buffer may further store user selections, processing specifics, and resultant files generated by processing within image processing unit 37. Additionally within image processing unit 37 is barcode processing unit 129 for identifying product information from a received image of a barcode.

In one example of a system design, image comparison services are to send and receive email messages with attachments. An email retrieval system, such as email generator 116, may be a constantly running program which periodically checks for email messages in a dedicated email box. Upon reception of one or more messages at the email box, the system processes each message in succession in the order received. During message processing, each message is checked for subject line content and a compatible image attachment. For example, when a message contains a compatible item category in the subject line, the email generator 116 uses this information for image comparison and matching. The email having this subject line content will typically also contain an image or have an image file attached. When more than one image is included and/or attached, the first image encountered is processed first. The first image encountered may be a first image in a list of attached images. Image comparison unit 120 uses each image to find similar images stored in image database(s) 130. A number of similar or compatible images may be found. The number used may be predetermined and specified by image processing unit 37, or may be specified by a requester. Once identified, URLs associated with similar images are compiled. The number of similar images may be a top five images most compatible to the received image. The compiled list of similar images, along with detailed information thereto, is sent to user layer 102 via the email generator 116. The list of images may be included in an email or may be generated as a file and attached to an email. The email is sent to the requesting email address. The original requester can then view the email containing the top five images most compatible to the one that was originally sent.

Returning to FIG. 3A, both user layer 102 and system layer 104 are able to communicate with image API layer 106, which is accessed using an HTTP GET or POST request, according to one example. Image API layer 106 enables processing of a received image according to the request specified by a requester. The specified request is referred to as an image service request. Note that a requester may be a machine, such as where automated processing is implemented. In one example, a machine is tasked with searching all commerce sites satisfying at least one criterion. In this case, the image service request is generated automatically, and the results are stored and processed according to algorithms and programming to accomplish a purpose. Similarly, the request may come from an image service within image processing unit 37, such as OCR unit 124, which may request data from database(s) 36 for processing and storage in image database(s) 130.

In responding to requests, image API layer 106 returns an XML file containing the requested data. Image API layer 106 contains multiple servlets, each relating to at least one type of image service, such as image comparison and OCR.

The API servlets can be called through HTTP GET and POST requests. The generic format for the GET request is as follows:

---

HTTP://<name of server>:<server port>/<servlet folder>/
        <servlet>?method=<name of method><other parameters>.

---

Fields for "name of server" and "server port" refer to the server in which the servlets are stored; the field "servlet" refers to the name of the servlet being used; and the field "name of method" refers to a specific method to be used. The other parameters are specific to each method. As used herein a method may be an operation or function to be performed by the recipient of the GET request. A method may relate to a search for a product similar to the image. One method may be to search for a product having a color similar to that of the image. Another method may be to search for a product having a similar shape to that of the image. Still other methods may instruct image services 120 to read a barcode, extract text, or perform OCR on the image. In this context, therefore, a method is a function provided by image services 120.

For example, an OCR servlet contains three methods: barcode, text, and barcodeGetItems. The barcode method receives the URL or image of a barcode, or an image containing a barcode, wherein the barcode method returns the integer string associated with the barcode. The method also takes in a URL or image containing text, wherein the method returns the text string produced by OCR unit 124. The text string contains text detected within the image. The barcodeGetItems method takes in a URL or image of a barcode, or an image containing a barcode, wherein the barcodeGetItems method returns a list of items having the same barcode as the received image. The barcodeGetItems method can also take in an optional parameter and count, which allows the user to specify the type of results and how many results are desired. If no parameter or parameter count are given, a default amount of items is sent back. Example input and output are as follows.

A. Barcode Method:
GET Request:

```
HTTP://d-sjc-
   dgolovnya:8080/imageServiceAPIServlets/OCR?method=
   barcode&url=HTTP://d-sjc-jeolson:8080/upc.png
```

Response:

```
<rsp stat="ok">
   <barcode>
      <value> 9780590353403 </value>
   </barcode>
</rsp>
```

B. Text Method:
GET Request:

```
HTTP://d-sjc-
   dgolovnya:8080/imageServiceAPIServlets/OCR?method=text&url=
   HTTP://d-sjc-jeolson:8080/DSCF0357.jpg
```

Response:

```
<rsp stat="ok">
<text>
   <value> Text from the given file. </value>
</text>
</rsp>
```

C. barcodeGetItems method:
GET Request:

```
HTTP://d-sjc-
  dgolovnya:8080/imageServiceAPIServlets/OCR?method=
  barcodeGetItems&count=2&url= HTTP://d-sjc-jeolson:8080/upc.png
```

Response:

```
<rsp stat="ok">
<items>
<item>
   <title>1st edition Harry Potter Hardcover</title>
   <BINPrice>null</BINPrice>
   <id>20200624161</id>
   <currentPrice>9.99</currentPrice>
   <bids>1</bids>
   <listingType>Chinese</listingType>
<pictureURL> HTTP://thumbs.ebay.com/pict/20200624161.jpg
</pictureURL>
   <primaryCategory>99000</primaryCategory>
   <startTime>2008-02-22T23:59:54.000Z</startTime>
   <endTime>2008-02-27T23:59:54.000Z</endTime>
   <sellerId>null</sellerId>
   <sellerFeedBackScore>null</sellerFeedBackScore>
     <sellerFeedBackRatingStar>null</sellerFeedBackRatingStar>
</item>
<item>
<title> HARRY POTTER ANT THE SORCERER'S STONE 1ST ED
   MINT COND.</title>
   <BINPrice>null</BINPrice>
   <id>120225247484</id>
   <currentPrice>49.99</currentPrice>
   <bids>0</bids>
   <listingType>FixedPriceItem</listingType>
<pictureURL> HTTP://thumbs.ebay.com/pict/120225247484.jpg
</pictureURL>
```

-continued

```
   <primaryCategory>99000</primaryCategory>
   <startTime>2008-02-21T18:00:4.000Z</startTime>
   <endTime>2008-02-28T18:00:4.000Z</endTime>
   <sellerId>null</sellerId>
   <sellerFeedBackScore>null</sellerFeedBackScore>
   <sellerFeedBackRatingStar>null</sellerFeedBackRatingStar>
</item>
</items>
</rsp>
``` wherein the SimilarImages servlet contains a method called getSimilarImages. The getSimilarImages method takes in a URL or image of an item to be compared, a category that the item in the image belongs to, and returns a list of eBay items similar to the given image. Since the current system uses pre-hashed images instead of live eBay images, currently only the image URLs of the pre-hashed images are returned. Example input and output are as follows:

D. getSimilarImages method:
GET Request:

```
HTTP://d-sjc-
   dgolovnya:8080/imageServiceAPIServlets/SimilarImages?method=
   getSimilarImages&count=5&category=Womens%20Bags&url=
   HTTP://d-sjc-jeolson:8080/purse.jpg
```

Response:

```
<rsp stat="ok">
<items>
<item>HTTP://d-sjc-
   dgolovnya:8080/Images/eBayWomensBags/26041904904.jpg</item>
<item>HTTP://d-sjc-
   dgolovnya:8080/Images/eBayWomensBags/12043680357.jpg</item>
<item>HTTP://d-sjc-
   dgolovnya:8080/Images/eBayWomensBags/110162411181.jpg</item>
<item>HTTP://d-sjc-
   dgolovnya:8080/Images/eBayWomensBags/304030945.jpg</item>
<item>HTTP://d-sjc-
   dgolovnya:8080/Images/eBayWomensBags/3041260162.jpg</item>
</items>
</rsp>
```

As illustrated in FIG. 3A, email generator 116 is responsible for checking for new email messages, processing those messages, and sending a response message back to the sender. The process begins on initiation of an email application used and controlled by email generator 116. A dedicated email box is checked for new emails periodically, such as every five seconds. Email box checking may be performed on occurrence of an event, such as in response to a request received at image API layer 106. When a new email is retrieved, sender information, subject line data, and image data, either included or attached, is extracted from each email message.

Once extracted, the image data is saved to the server running the email generator 116. Links to the images are sent along with the GET requests made to the servlets in the image API layer 106. When an email is received without an image, an error message is sent to the sender. Similarly, an error message is sent if the subject line does not contain information in a format specified for image processing. In one example embodiment, when an email is received having multiple images, the first attached image is processed and others are ignored.

When a received email contains both a valid image file and a valid subject line, a GET request is made to a servlet in image API layer 106; the particular servlet is specified in the subject line of the email. Once a request is made, and email generator 116 receives the response back from the API servlet, email generator 116 processes the received information to generate and output results.

Implementations of user layer 102 may vary for different embodiments. For example, one embodiment uses an email web interface, such as Gmail by Google, a mobile communication interface, such as an email interface for an iPhone by Apple, and a custom web interface. In operation, a user may access system layer 104 and image API layer 106 by sending an email to a dedicated email address. This may be done directly from a mobile communication interface, such as from an iPhone email interface, providing convenience and flexibility in using image services. The user then receives a response from the system containing results of the image based query. Alternate email interfaces and client applications running on a mobile device may communicate in a similar manner. Similar processing is also enabled for web interfaces having an email interface.

Additionally, system layer 104 includes an HTTP generator 118, which provides a web interface. HTTP generator 118 makes GET and POST calls directly to image API layer 106, and receives XML responses. As illustrated in FIG. 3A, web interface 112 in user layer 102 sends HTTP requests to HTTP generator 118. Once a request is received, HTTP generator 118 processes the request, which often includes communication with image API layer 106 to facilitate image processing by image services 120. After processing a request, HTTP generator 118 sends a response to web interface 112 in the form of HTTP content.

Image API layer 106 and image services 120 provide a variety of image processing services. An example image service is OCR with the ability for image API layer 106 to take in an image file of any source of text (e.g., a book cover, page of text, product label, etc.) which may be either text only or may contain a barcode of the item. The API layer 106 calls an OCR program, such as a command-line program, giving it the image file as a parameter. When the OCR program is finished image API layer 106 receives the output string that is produced by OCR.

An application server, such as Apache Tomcat, may be used to host servlets in image API layer 106. To expose these servlets to client machines, an IDE, such as Eclipse EE by Apache Foundation Software, may be used to support web project development. In one embodiment, the IDE maintains a log of modified or added Java classes as well as entries in the configuration files. The IDE may then export a developed project as a Web Application aRchive (WAR) archive.

To complete the final implementation of the system 100, email generator 116 and the API servlets each run on separate computers. This ensures that the computer running the servlets, which also processes the images through either the OCR program or the image comparison algorithm, is dedicated to that task and would not also have to be simultaneously checking for emails. This essentially allows each layer of the system to be completely separated from each other layer, allowing for much more flexibility. API servlets may be resident in system layer 104 or in image layer 106. Additionally, when calling from user layer 102 to image layer 106, API servlets may be resident in user layer 102 as well.

In one example embodiment, system 100 is used to automatically generate a publication for an item or service based on an image. The publication may be an advertisement, product listing, or auction listing, such as in an ecommerce system. The image may be a picture of a product or an image of identifying information associated with the product, such as a barcode, serial number, or unique identifier.

Figure 5:
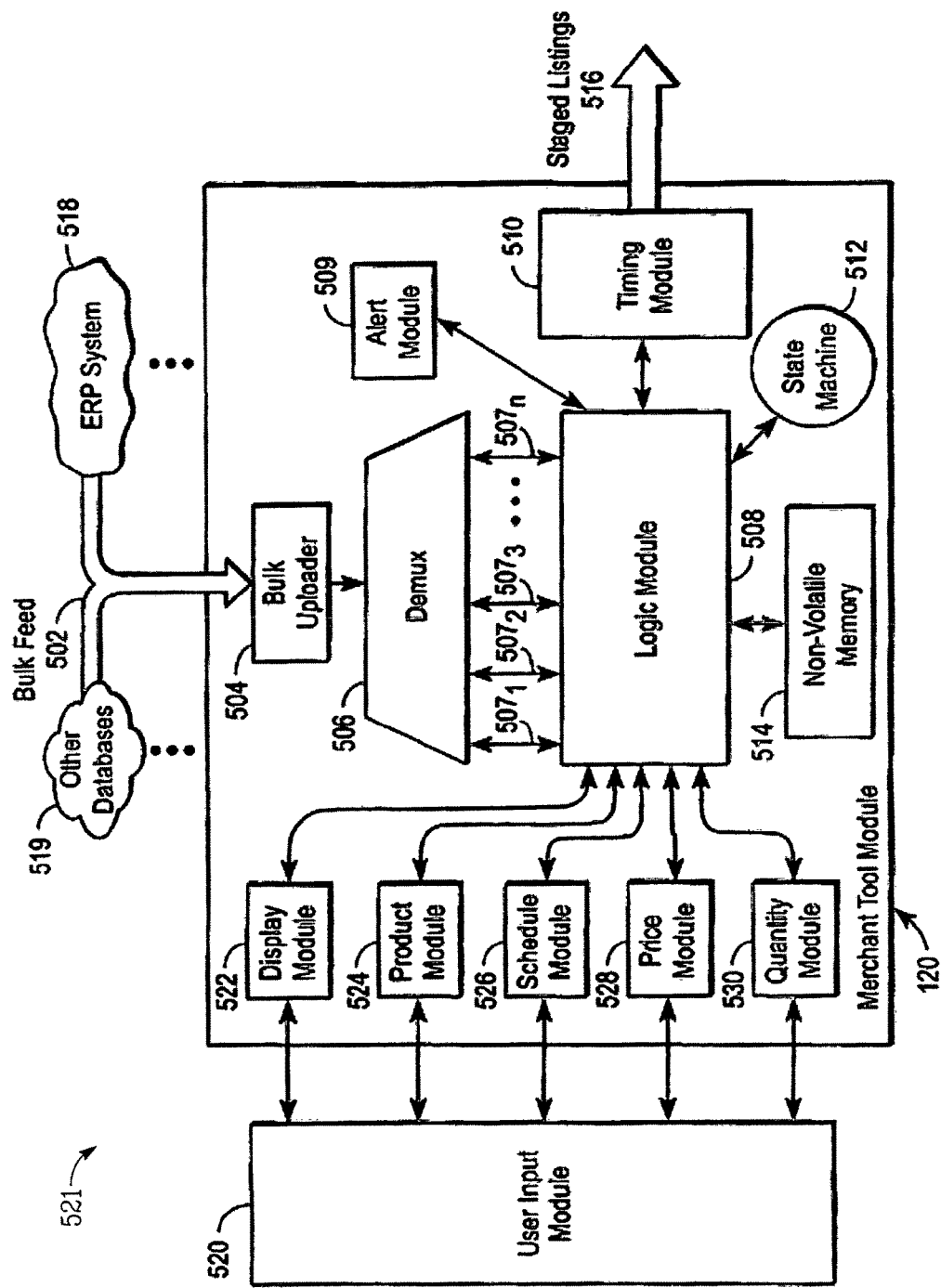
FIGS. 5 and 6 are block diagrams illustrating a merchant tool module, according to an example embodiment.

FIG. 5 illustrates a merchant tool module 521 used to generate listings for an ecommerce system, such as an auction system. Images are transmitted to a publication system implemented by merchant tool module 521.

In an example embodiment, merchant tool module 521 includes a display module 522, a product module 524, a schedule module 526, a price module 528, and a quantity module 530, as well as a bulk uploader 504, a demux 506, a logic module 508, a non-volatile memory 514, a state machine 512, and a timing module 510.

A user input module 520 and at least one Enterprise Resource Planning (ERP) system 518 may be external to the merchant tool module 520. Note, more than one ERP system 518 may also feed into merchant tool module 520 through bulk uploader 504. Also identified in FIG. 5 is a bulk feed 502 which provides a path into merchant tool module 521 for providing bulk uploads from ERP system 518 and other databases 519. The ERP system 518 may also be a spreadsheet or other form of database including data relevant to a listing on a network-based trading marketplace or other ecommerce system. Bulk uploader 504 may receive product information from ERP system 518 and/or other databases 519. Multiple ERP systems 518 and/or databases 519 may feed into bulk uploader 504. Bulk uploader 504 may check the integrity of the data received from ERP system 518 by ensuring the data matches the format of fields used for particular network-based marketplace or trading platform, and upon completing these integrity checks, may input data received into a data aggregator or demux 506. In one embodiment, bulk uploader 504 is a separate module accessing and performing integrity checks on inventory associated with a plurality of databases across a plurality of network-based trading environments.

In another embodiment, bulk uploader 504 may receive input regarding product information by automatically crawling databases or websites, such as using a digital spidering technique, or retrieving product information from at least one database at a seller and automatically applying at least one password access algorithm. The product information may include image data, such as photographs, drawings or other images, and may include bar codes or other unique identifiers. The bulk uploader 504 may automatically access and input password information to gain access to a plurality of databases of a high volume seller, and may periodically spider or search to determine whether there have been new databases added by a particular high volume seller, wherein new information is to be indexed and periodically monitored for uploading product information into merchant tool module 521 through bulk uploader 504.

In one embodiment, a user may input information into user input module 520 to set one or more characteristics of a product, listing or image by manually inputting data through an input device (not shown). In another embodiment, user input module 520 receives input regarding at least one defined characteristic and tracks metrics from a group including profit, loss, revenue, seasonal preference, and listing effectiveness. Once demux 506 receives data from bulk uploader 504, demux 506 parses a single file as uploaded from ERP system 518 into merchant tool module 521 into individual products 507 for transmission to demux 506 and to logic module 508 for processing. Demux 406 is included for illustration, and other implementations may not include demux 506. Alternate embodiments may employ an operation to separate a table having multiple products into individual products.

Once logic module 508 receives data on individual products 507, logic module 508 uses non-volatile memory 514 and state machine 512 to assign and arrange individual products 507. Individual products (or listings) 507 are assigned or arranged based on one or more characteristics within display module 522. Characteristics may be determined by system 100 or may be selected or input by a user. Additionally, individual products 507 may be arranged with product module 524, schedule module 526, price module 528 or quantity module 530. Logic module 508 may automatically assign characteristics to a particular listing. Operation of logic module 508 in performing various functions to prepare an item to be listed is described in greater detail with reference to FIG. 6. In one embodiment, logic module 508 may be a pre-listing management logic module that receives plurality of defined characteristics and that includes at least some of the defined characteristics to prepare a new listing.

In an example embodiment, user input module 520 allows a particular user to schedule listings and select a particular characteristic for application to one or more listings 507, to 507, received from demux 506 into logic module 508. In an alternate embodiment, user input module 520 contains a client-server based user interface, such as a standalone application communicating over the Internet, from which a particular user inputs criteria or characteristics they would like to see on a particular listing uploaded from ERP system 518. For example, criteria may be based on preset attributes within each one of modules 522, 524, 526, 528, and 530, such as display, season, duration, and so forth. Non-volatile memory 514 may store one or more products $507_1$ to $507_n$. For example, non-volatile memory 514 may store listings of products after logic module 508 has associated a particular characteristic to one or more products $507_1$ to $507_n$. As such, logic module 508 associates individual products to attributes predefined by a user.

Continuing with FIG. 5, logic module 508 may be coupled to an example alert module 509 and timing module 510. Alert module 509 may transmit alerts back to a user communicating with merchant tool module 521. For example, alerts may include an error in upload alert, an inconsistent characteristic association alert, a user input alert, and so forth. In another example, alert module 509 may automatically notify a seller that at least one of a plurality of characteristics within display module 522, product module 524, schedule module 526, price module 528, or quantity module 530 are not associated due to an association error between a characteristic and a listing.

Timing module 510 may receive associated products. In addition, timing module 510 may also prepare listings to be initiated in network-based marketplace environments. By associating time phase elements to each listing, timing module 510 generates staged listings 516. For example, timing module 510 may identify or define when a particular listing is presented live to users of the marketplace, how long listings are maintained on the marketplace, and so on. Timing module 510 generates staged listings 516 which are uploaded to the marketplace environment.

Timing module 510 may also use a jitter application to apply a time-phased jitter to individual listings, such as where a number of listings for a same product have different start and end times. This creates time jittered listings. Time-phased jitter is a variation in the time a listing is to start or end in order to allow for multiple listings of a same product to list or start at slightly different times thereby allowing potential buyers multiple opportunities to purchase a particular type of product. The multiple products or multiple listings of a same product may be uploaded into the system for such processing by a high volume seller. As an example, consider a sale of 10 widgets over an auction trading ecommerce marketplace, wherein all 10 widgets are individually listed, and are scheduled to begin and end a few minutes or hours apart. This allows buyers multiple opportunities to submit a successful bid.

Figure 6:
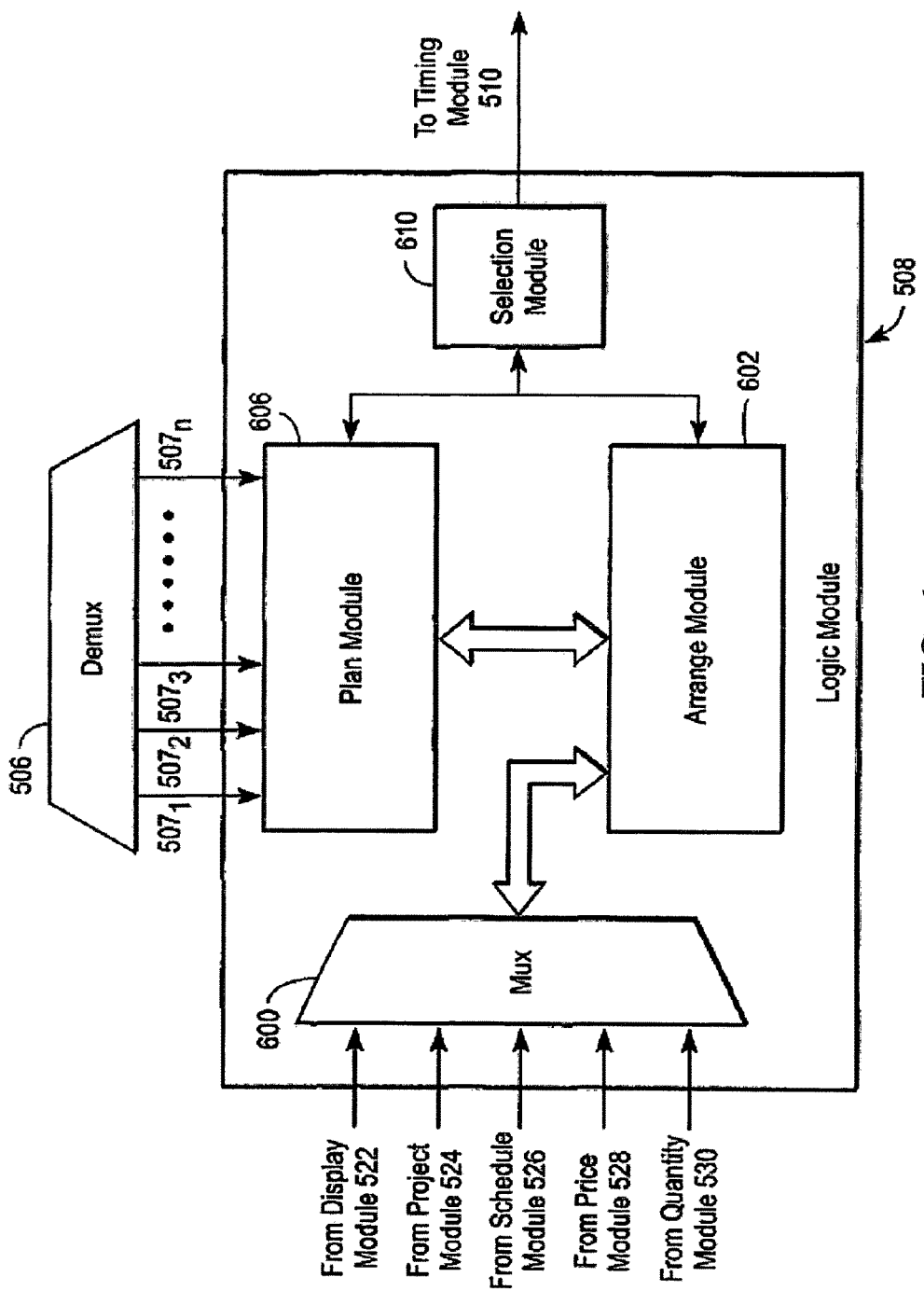

Details of logic module 508 are illustrated in FIG. 6, wherein logic module 508 includes multiplexer 600, plan module 606, arrange module 602, and selection module 610. Multiplexer 600 may, for example, receive characteristic information from display module 522, from project module 524, from schedule module 526, from price module 528, or from quantity module 530. Characteristic information may include product details, bar code information, unique identification information, database storage identification information, inventory identification information, and so forth. Characteristics may also be features of image data, such as color, size, text format, text font, and so on.

The multiplexer 600 may pass information to arrange module 602 after aggregating different combinations of characteristic information as applied to a particular listing. Alternative embodiments implement alternate operations, in place of or in addition to multiplexer 600, to combine characteristic information received from a plurality of modules into a table for use by arrange module 602.

Arrange module 602 may arrange how particular characteristics are displayed when a listing is made available to a user of a marketplace environment. A logic algorithm may automatically determine how to arrange listings and how to display listings for a user. In one example, plan module 606 may receive information from demux 506, such as individual products $507_1$ to $507_n$, and automatically determine what information to include in a listing or detail page. Information may include which items to list, what characteristics to list, which particular items to list, item statistics, and so forth. Arrange module 602 and plan module 606 may communicate by coordinating which particular attribute and characteristic will be associated with a particular listing. This information may then be provided to selection module 610 to prepare listings for transmission to timing module 510. In this way, a seller-defined number of items may go live or be listed on a selected day and in a staggered fashion, further listings for a second user defined number of items may go live on another day.

As discussed above, image processing services, such as those supporting image based search involves searching for similar images using an interface, such as an API, for sending and receiving specifically formatted emails. The image processing services may extend to image based searching using digital photographs of products, product information, barcodes, product identifiers, and so on. Alternate embodiments may include one or more of these image processing services configured according to the specific application and products involved.

Mobile, wireless and cellular technology extends network capabilities allowing users to move freely while maintaining a connection to the Internet. Mobile devices have built-in cameras with ever increasing resolution and high-speed data transmissions. By applying one or more image processing services to mobile technology, a user may retrieve live listings from marketplace sites, such as from an eBay auction, by taking a photograph and sending it as an attachment to a specific URL address, email address, IP address or telephone number. In one embodiment, a user communicates this image information via email, due to the ubiquitous access to POP and SMTP client software, which is available for a variety of operating platforms, including wireless operating systems for mobile devices, such as PDAs, cellular phones, and other wireless devices.

In yet another application, various algorithms are developed to find images similar to input image information. The algorithms analyze a received image and produce results based on characteristics, such as shape, color, and texture of the given image. Note that in one embodiment, image information is input into merchant tool module 521, where the information is processed according to characteristics and other criteria, and the resultant information mapped to products is stored in product database 622.

Figure 7:
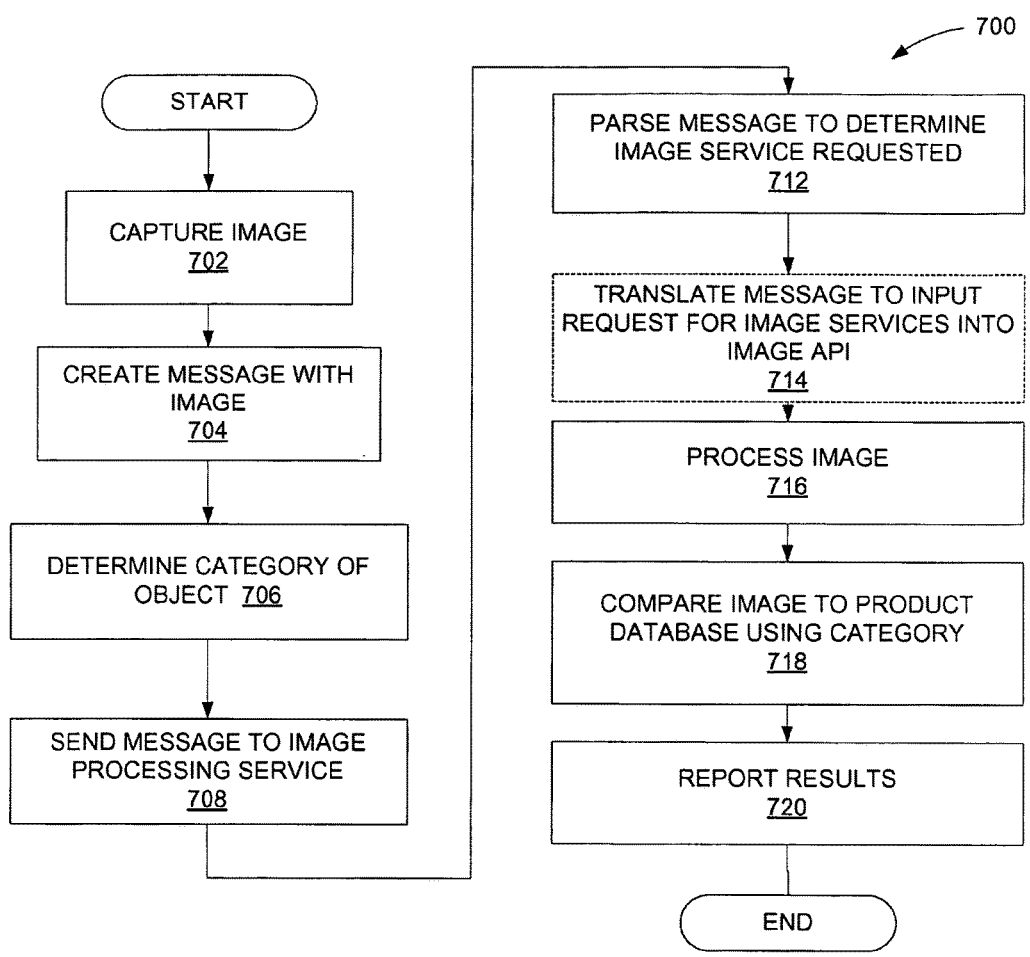
FIG. 7 is a flow diagram illustrating an image processing method, according to an example embodiment.

FIG. 7 illustrates a method for identifying products from input image data. Method 700 begins by capturing, 702, mage information, such as when a user takes a photograph or picture of an object to match to a product. A message is created, 704, with the image, such as wherein a captured image is included in an email, which is created and addressed to a specified account. One embodiment uses a dedicated email alias for easy access. The photograph may be included in the email or may be sent along with the email as attachment. Similarly, the message may be message sent in a communication protocol, such as an HTTP message. In one embodiment, the method then determines, 706, a category of the object in the photograph. Determination of a category may be automated processing, wherein a category is selected based on characteristics or parameters of the image data, or determination may be sent as an instruction. Such instruction or information may be sent as an email or HTTP message, and may be included with the image data or data object, or may be sent as a separate message.

Determination of a category may be in response to a user selection or specification of a category of the item. The category assists in locating a corresponding product. The category may be provided as a command in a subject line of an email, which follows simple command language rules, or may be communicated by a predetermined signalling protocol. For example, a command to identify images in category "Women's bags" may be given as:

image compare Womens Bags wherein the request email structure is given as:

| from: | Denis Golden |
|---|---|
| to: | erl-image-service@marketplace.com |
| date: | Wed. Feb. 27, 2008 at 10:33 AM |
| subject: | image compare Womens Bags |
| mailed by: | mail program |

Method 700 continues to send, 708, the message to an image processing service. Note, as illustrated in FIG. 3A, the message may be sent directly to image API layer 106 or may be sent via system layer 104. In either situation, the message is parsed to determine, 712, the type of image service requested. When the message is sent to system layer 104, this layer translates, 714, the message to generate an input consistent with the API format of image API layer 106. This is an optional step, that is not needed when the message is sent directly to image API layer 106. System layer 104 is to receive emails including the image data and the image request. This facilitates easy communication between user layer 102 and image processing services 120. On detection of a new email sent to the account being monitored, information is extracted from the subject line from the email and in response, appropriate algorithms are identified and run.

The request is then sent to an image API where it is processed, 716, according to the request. The use of an image API available at the system layer avoids having a user set up or implement a UI with image processing. Once the image service is determined, the method processes the image data according to the selected image service. For example, the method may compare object images to product databases to identify a match. In the present example, a match indicates an object or product for sale, which is presented to a user interested in finding such products.

The method then compares, 718, the image to a product database according to the category selected or determined. Upon retrieval of product information, a report is provided, 720, to the requester. The report may provide an identifier associated with a product or products related to the image, a detail page of information related to such product(s), or other information for locating and identifying the product. The report may further suggest other categories of products related to the image. The methods of FIG. 7 may be extended to include a fraud detection method, as detailed hereinbelow with respect to FIG. 12. Accordingly, the image may be compared against a product database to identify fraudulent products or information.

Figure 8:
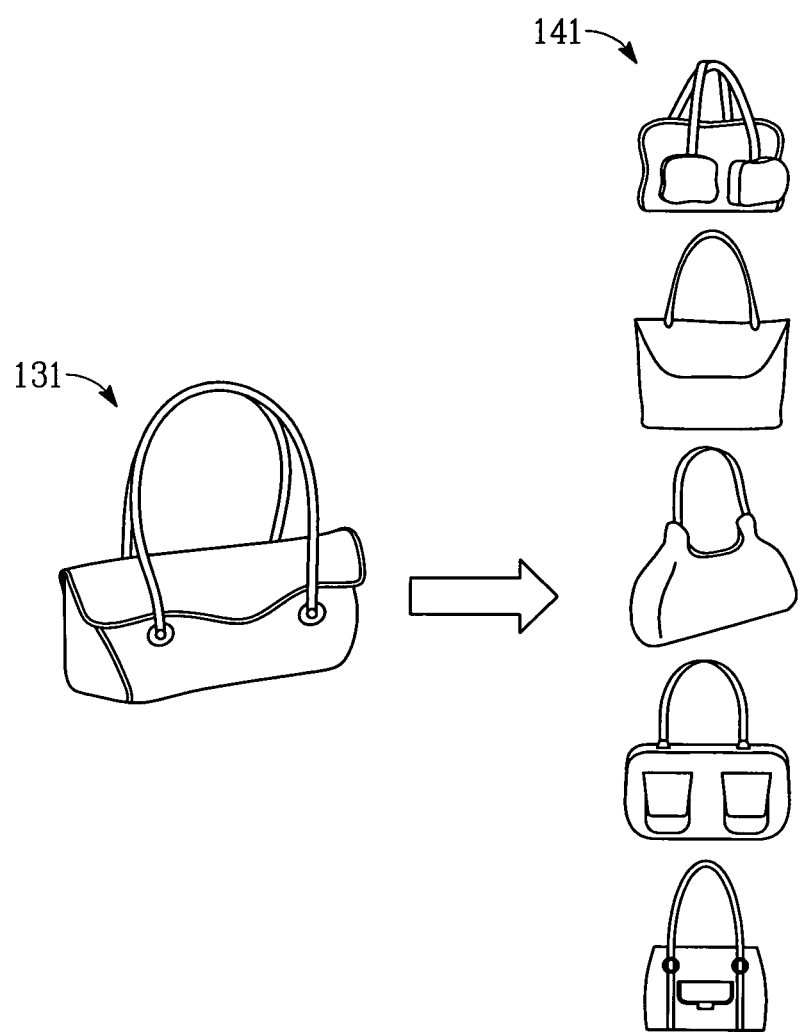

An example of image processing, such as according to a method of FIG. 7, is illustrated in FIG. 8, for a received object 131, which is input for image processing, the method searches for similar images in Women's Bags category. Once comparisons are made and similar objects are found, a list of images 141 is provided to the requester. The response may have the same look and feel as the marketplace website. The response email displays the first five similar images found in the database.

Another application of image processing services, as discussed hereinabove, is optical recognition of barcodes. A requester submits image information, such as a photograph of the barcode. As illustrated in FIG. 3A, barcode information is passed from user layer 102 to system layer 104, which then interfaces with image API layer 106 to initiate image processing services. Once a barcode is recognized, the system layer 104 requests image API layer 106 to retrieve items corresponding to the barcode, such as from product databases or from a live auction information. Using this approach, the user does not need to provide additional information, such as the brand or model for electronic devices to obtain the list of the items of the same kind. The system layer 104 manages all communication with image processing services, including complicated marketplace specific communications and calls, as well as interfacing with OCR processes. The end user simply sends an email to the system and gets back a reply containing links to live eBay auctions. The requesting email may contain an image of the barcode along with an appropriate subject line. The subject line may be of the following format, including:

barcode items wherein the request email structure is given as:

| from: | Denis Golden |
|---|---|
| to: | erl-image-service@marketplace.com |
| date: | Wed. Feb. 27, 2008 at 11:23 AM |
| subject: | barcode items |
| mailed by: | mail program |

An example of an attached image of a scan of the barcode is provided in FIG. 9. In this case, the barcode 151 corresponds to a popular novel. The results 153 are provided to the user as a set of items corresponding to the barcode information. In one embodiment, results include other books related to the book associated with the barcode.

Whenever a new email is received, image-processing information may be included in the subject line of the email. Image processing uses a character recognition application to identify the instruction or command associated with the subject line. Continuing with method 700, comparing an object image, which in this case is a barcode, to products in a product database, 712, will retrieve specific items. The response includes listings for items matching the barcode. The response may be provided as an email with titles, current bids, and other relevant data of the various marketplace activity and status. A user then receives the response email within which the user is able to select items, or click on the images, to be redirected directly to the marketplace seller's page for the item or product. The process may automate and allow log-in and bidding on the items of interest.

Further example embodiments may include the ability to work with live auctions when searching for similar images. In this way, an image API may operate in real time monitoring a user's activity, so as to include the user's activity in at least one of the image processing steps. For example, the user's activity or history may indicate a reduced number of categories to select from or to present to the user for selection. Similarly, the user's activity may provide information as to how to expand the search for items.

A high volume marketplace, according to one embodiment, implements several dedicated servers to manage the hashing of incoming images. In one example, the image processing targets specific categories. Various other algorithms may be employed for extracting features information, such as based on color, shape or texture, and inserting such information in a database for future comparisons.

As discussed herein, methods and apparatus for image recognition services is provided wherein a request is made to an application interface, wherein commands included in a communication instruct image processing services as to a requested type of image service. In one embodiment, the communication is an HTTP message, such as is sent using a GET/POST protocol. Alternate embodiments may implement other forms of communication allowing ease of interface with the image processing service. In one embodiment, a communication is made by an email, wherein a command is included in the subject line of the email. In a mobile embodiment, a communication is part of a signalling protocol, wherein commands are included in the message sent from a user's mobile device to a network. A system layer of the network receives the requests and interfaces with the image processing services and applications. The image processing includes an image based search, wherein the communication receives an image of a product or item to identify, and the service compares the received image to a database of products. The received image may be a barcode of a product to be matched to a corresponding product. Another service offered by the image processing services is OCR, wherein textual information is recovered from a received image and used to identify products or images. In one embodiment, image processing services are used to develop a listing of a product or item for sale or auction. In still another embodiment, image processing services are used for fraud detection and to confirm the accuracy of a commerce transaction, such as a sale or auction item being offered at a correct price, or that the detail information associated with the product is correct.

Other embodiments may implement alternate communication techniques, wherein commands and instructions for image processing are included in the messaging or signalling. Email messaging may be used either in a stand alone email application or via a website. A user application layer allows use of email clients as well as web browsers to interact with both the system layer and the image API layer of a networked computing environment. Further embodiments may include other user layer extensions to interact with various portions of system layer 104.

An example system layer manages email messages using an email content generator; however, alternate embodiments may include additions to system layer 104 such as extensions to manage Web content as well. Such extension may accept a request from a web browser in user layer 102, forward the request to image API layer 106, receive an XML response, and format the response to send to the original requester or user. The system layer 104 may further add security or other processing according to the requirements of the network and user. Formatted data is then sent back to a web browser. It will be appreciated that there are also many other possible ways to generate content and these may be incorporated within system layer 104.

Image API layer 106 may be further extended to implement other functions, in addition to OCR and image comparison services. While described herein as using a dedicated Java servlet for each task, image services may be implemented in a variety of ways using other programming languages and architectures. Extending the system may include creating a new Java servlet to handle each new image service. The servlet may map each function in a new image service to a method request, which is defined in a communication format. Additionally, the image processing services may handle various parameters made as part of the HTTP GET or POST request.

The above described example embodiment provides a highly extensible system to interact with various types of image services. An image API layer 106 handles HTTP GET and POST requests and generates appropriate XML responses. This includes the ability to interpret communications where information is included in a URL or subject line and where image data is attached. For example, the image API layer 106 is able to receive a generic GET request, such as:

/<service>?method=<method_name>&<parameters>
Generic XML response:

```
<rsp stat="ok">
    [Data in XML format - see individual methods]
</rsp>
```

Similarly, the image API layer 106 supports OCR responsible for text and barcode recognition.

Figures 10, 11:
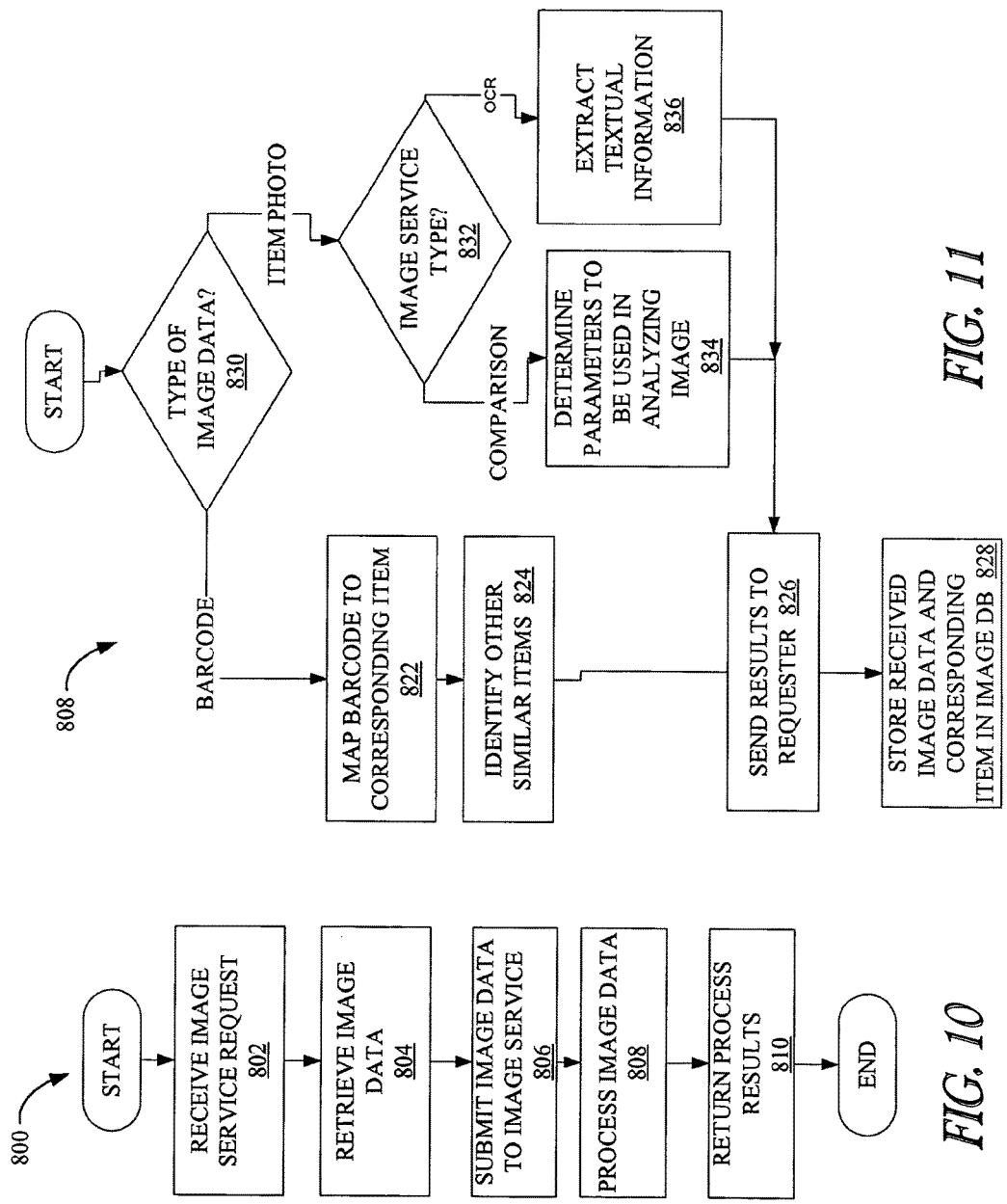
FIGS. 10 and 11 are flow diagrams illustrating methods for image processing, according to an example embodiment.

FIG. 10 illustrates a method for processing images in a system such as illustrated in FIG. 3A, wherein the system first receives, 802, an image service request. In response to the request, the system retrieves, 804, image data from the request. The system submits, 806, the image data to an image service, which processes, 808, the image data providing, 810, results to the requester.

FIG. 11 further details the operation of processing, 808, image data, wherein a first decision is made, 830, as to the type of image data received. For barcode information, processing continues to map, 822, the barcode data to a corresponding item in a product database. Further, the method identifies, 824, other similar items, which may be done according to product category, color, size, or other characteristic of the product. Results are then sent, 826, to the requester. Additionally, a database may be maintained with the mapping of the received data image and the corresponding product(s) retrieved, 828, from the product database. By maintaining such records, future image comparison and retrieval of product records is enhanced, as retrievals may search a smaller collection of products to find a match. In one embodiment, future comparison and search is done in parallel, wherein one search is done on the complete product database, while a second search is done using the compiled information from previous searches. When a match is found, an initial result is available for the requester.

Continuing with FIG. 11, if the image data is graphic data, such as photographic type data, the specific image processing service type requested is determined, 832. For a comparison type image processing service, the method determines, 834, the parameters to be used in analyzing the image. The parameters may refer to characteristics of the item or product, such as size, color, texture, and so forth. Additionally, the parameters may specify particulars of how to analyze the image. Similarly, if the image processing service type is OCR, the method extracts, 836, textual information. Alternate embodiments may include other image processing in combination or in place of those illustrated in FIGS. 10 and 11. Similarly, the image processing may involve multiple steps, wherein a first image processing service is performed resulting in a processed image, and then a second image processing service is performed resulting in a final image. For example, the image may include borders or spurious markings not intended for inclusion in the image. Processing may include steps to clarify the image by removing such elements and marks. Further, it may be desirable to extract or read bar code information and also to compare an image of a product to a product database, such as for fraud detection or for increased certainty of the comparison. Further, while the method of FIG. 11 relates to barcode and photo image data, other images may be considered as well, including, graphic images prepared by hand or by electronic means. Such image data may be scanned into a computing device or computing system and provided as input for image processing services.

In another aspect, image services may implement fraud detection. Certain default assumptions may be made with respect to the publication or listing, or be included within the publication as publication data. For example, a certain price may be automatically associated with a product that is advertised for sale in the listing, based on the pricing of similar or comparable items that are currently being offered for sale, or have been sold in the past have via a transaction platform supported by a publication system.

Figure 12:
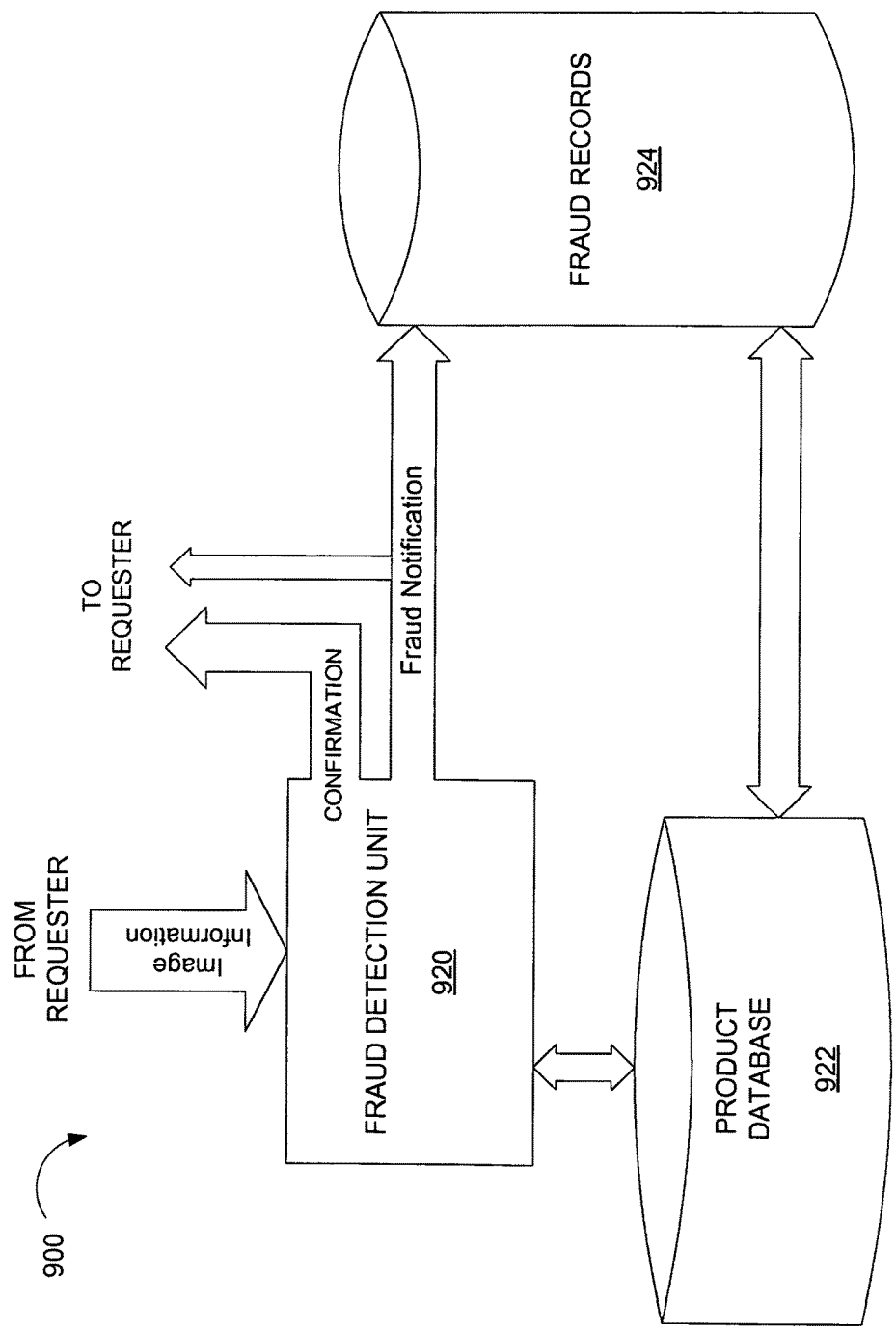
FIG. 12 is a block diagram illustrating a fraud detection module, according to an example embodiment.

FIG. 12 illustrates a module 900 for fraud detection using image based information. Product information, such as characteristics or other information either received from the input image data or from user input or selection, is provided to fraud detection unit 920. On receipt of the product information, fraud detection unit 920 determines appropriate information for comparison, and accesses product information in product database 922. Appropriate information may be a function of the product information matched to input image data, or may be a function of a seller or user selected category of products. Fraud detection unit 920 matches the received information to information stored in product database 922, and where the received information is consistent with the stored information, a confirmation is provided indicating valid images and product information. If, however, the information is not consistent, then a fraud alert is provided.

In an example embodiment, image processing services 120 may enable a fraud prevention function to automatically provide an indication as to whether a particular item is a genuine or fraudulent item, based on a comparison of an image, e-mailed or otherwise transmitted to the system, with a stored collection of images of either genuine or fraudulent items. Certain features of an item may be flagged within the system for particular scrutiny and as being particularly indicative of whether an item is fraudulent or genuine. Fraud detection unit 620 is therefore adapted for image comparison and image compression to accomplish such processing.

Continuing with FIG. 12, in one example of image based fraud prevention, image information is captured and sent to fraud detection unit 920 for comparison to product database 922. On identification of valid image in product database 922, confirmation results are provided to the requester. On detection of a fraudulent product, fraud detection unit 920 sends a fraud notification to the requester, as well as storing fraud information in fraud records 924. By storing the identified fraudulent information, this information is available for storing and indexing, which may then be used in future fraud detection or image recognition services. Fraud detection provides confidence that an advertisement or offer is genuine and may assist a user to avoid Intellectual Property (IP) infringement, such as by providing infringing goods for sale. In one embodiment, a fraud notification includes image data previously classified as fraud. In combination with bulk uploading of images, such as illustrated in FIGS. 5 and 6, fraud detection techniques enable bulk processing of multiple images to identify knock-offs or other illicit goods.

Figure 13:
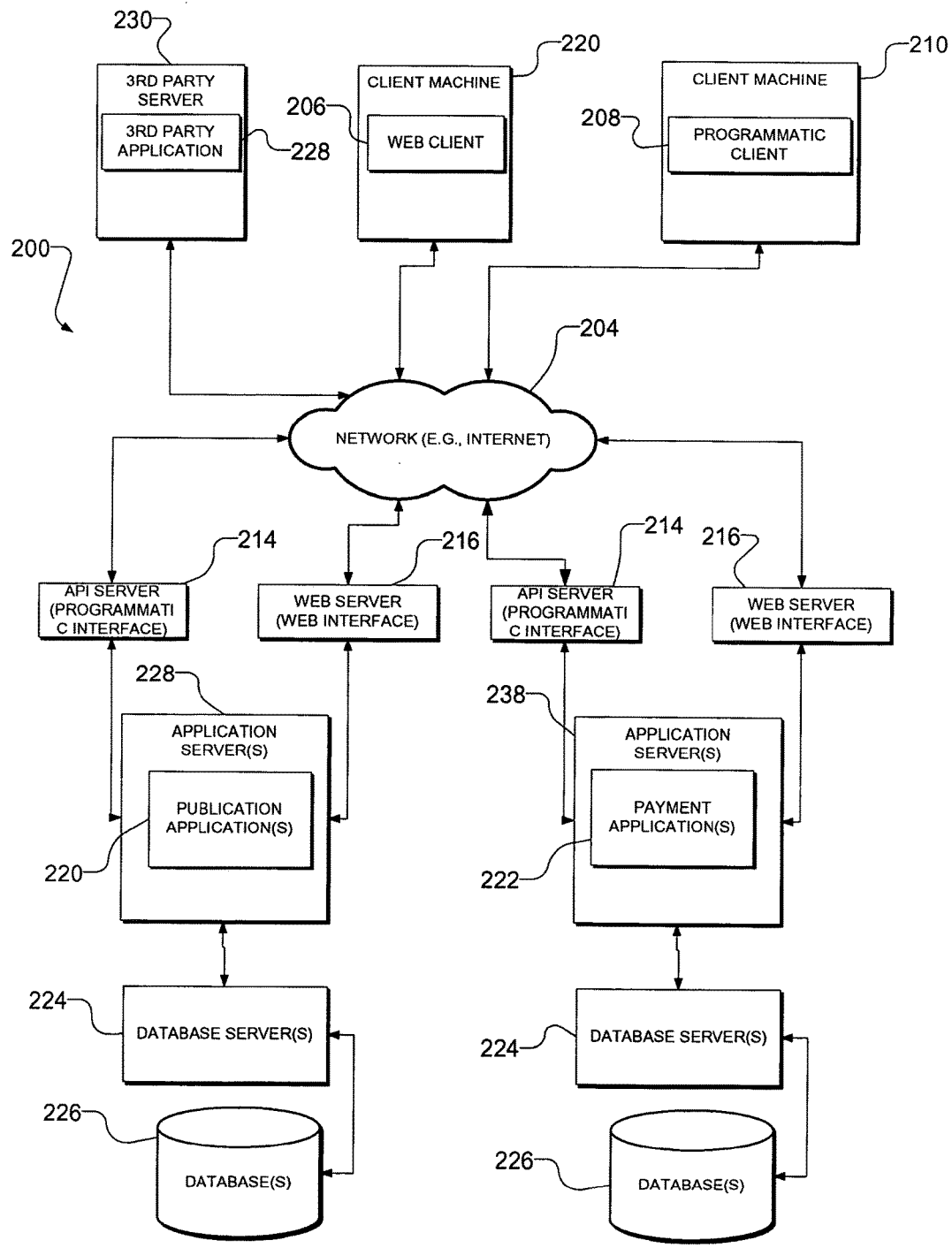
FIG. 13 is a block diagram illustrating a client-server system, according to an example embodiment.

FIG. 13 is a network diagram depicting a client-server system 200, within which one example embodiment may be deployed. A networked system 202, in the example form of a network-based marketplace or publication system, provides server-side functionality, via a network 204 (e.g., the Internet or Wide Area Network (WAN)) to one or more clients. FIG. 13 illustrates, for example, a web client 206 (e.g., a browser, such as the Internet Explorer browser developed by Microsoft Corporation of Redmond, Wash. State), and a programmatic client 208 executing on client machine 210.

An API server 214 and a web server 216 are coupled to, and provide programmatic and web interfaces respectively to, one or more application servers. The application servers 238 host one or more publication applications 220 and payment applications 222. The application servers 228 and 238 are, in turn, shown to be coupled to one or more databases servers 224 that facilitate access to one or more databases 226.

The marketplace applications 220 may provide a number of marketplace functions and services to users that access the networked system 202. The payment applications 222 may likewise provide a number of payment services and functions to users. The payment applications 222 may allow users to accumulate value (e.g., in a commercial currency, such as the U.S. dollar, or a proprietary currency, such as "points") in accounts, and then to later redeem the accumulated value for products (e.g., goods or services) that are made available via the marketplace applications 220. While both the marketplace and payment applications 220 and 222 are shown in FIG. 13 to form part of the networked system 202, it will be appreciated that, in alternative embodiments, the payment applications 222 may form part of a payment service that is separate and distinct from the networked system 202.

Further, while the system 200 shown in FIG. 13 employs a client-server architecture, the present methods, apparatus and examples are of course not limited to such an architecture, and may equally well find application in a distributed, or peer-to-peer, architecture system, for example. The various marketplace and payment applications 220 and 222 may also be implemented as standalone software programs, which do not necessarily have networking capabilities.

The web client 206 accesses the various marketplace and payment applications 220 and 222 via the web interface supported by the web server 216. Similarly, the programmatic client 208 accesses the various services and functions provided by the marketplace and payment applications 220 and 222 via the programmatic interface provided by the API server 214. The programmatic client 208 may, for example, be a seller application to enable sellers to author and manage listings on the networked system 202 in an off-line manner, and to perform batch-mode communications between the programmatic client 208 and the networked system 202.

FIG. 13 also illustrates a third party application 228, executing on a third party server machine 230, as having programmatic access to the networked system 202 via the programmatic interface provided by the API server 214. For example, the third party application 228 may, utilizing information retrieved from the networked system 202, support one or more features or functions on a website hosted by the third party. The third party website may, for example, provide one or more promotional, marketplace or payment functions that are supported by the relevant applications of the networked system 202.

Figure 14:
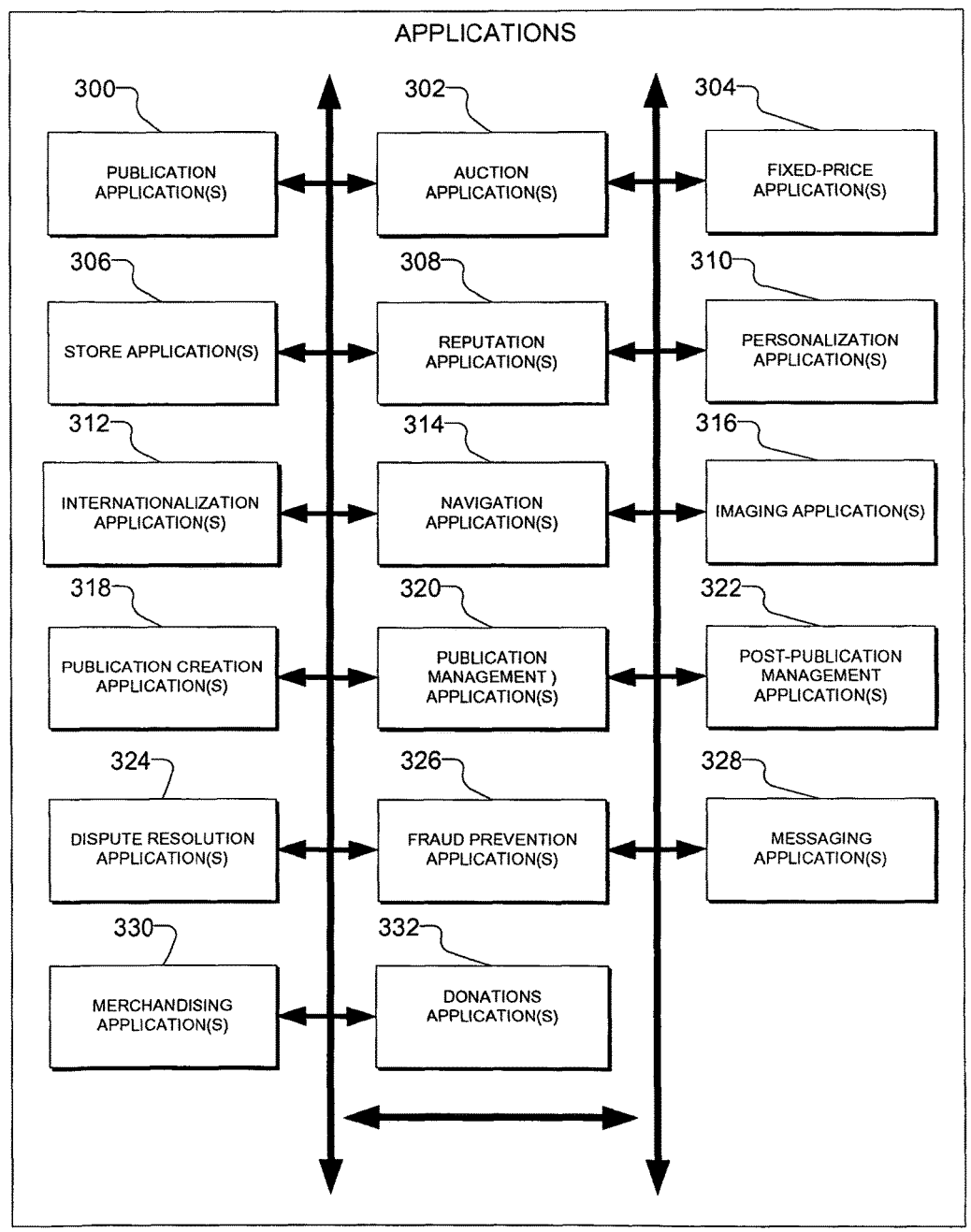
FIG. 14 is a block diagram illustrating multiple applications, according to an example embodiment.

FIG. 14 is a block diagram illustrating multiple applications that, in one example embodiment, are provided as part of the networked system 202. The applications may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 226 via the database servers 224.

The networked system 202 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the applications are shown to include at least one publication application 300 and one or more auction applications 302 which support auction-format listing and price setting mechanisms (e.g., English, Dutch, Vickrey, Chinese, Double, Reverse auctions etc.). The various auction applications 302 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 304 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 306 allow a seller to group listings within a "virtual" store, which may be branded and otherwise personalized by and for the seller. Such a virtual store may also offer promotions, incentives and features that are specific and personalized to a relevant seller.

Reputation applications 308 allow users that transact, utilizing the networked system 202, to establish, build and maintain reputations, which may be made available and published to potential trading partners. Consider that where, for example, the networked system 202 supports person-to-person trading, users may otherwise have no history or other reference information whereby the trustworthiness and credibility of potential trading partners may be assessed. The reputation applications 308 allow a user, for example through feedback provided by other transaction partners, to establish a reputation within the networked system 202 over time. Other potential trading partners may then reference such a reputation for the purposes of assessing credibility and trustworthiness.

Personalization applications 310 allow users of the networked system 202 to personalize various aspects of their interactions with the networked system 202. For example a user may, utilizing an appropriate personalization application 310, create a personalized reference page at which information regarding transactions to which the user is (or has been) a party may be viewed. Further, a personalization application 310 may enable a user to personalize listings and other aspects of their interactions with the networked system 202 and other parties.

The networked system 202 may support a number of marketplaces that are customized, for example, for specific geographic regions. A version of the networked system 202 may be customized for the United Kingdom, whereas another version of the networked system 202 may be customized for the United States. Each of these versions may operate as an independent marketplace, or may be customized (or internationalized) presentations of a common underlying marketplace. The networked system 202 may accordingly include a number of internationalization applications 312 that customize information (and/or the presentation of information) by the networked system 202 according to predetermined criteria (e.g., geographic, demographic or marketplace criteria). For example, the internationalization applications 312 may be used to support the customization of information for a number of regional websites that are operated by the networked system 202 and that are accessible via respective web servers 216.

Navigation of the networked system 202 may be facilitated by one or more navigation applications 314. For example, a search application (as an example of a navigation application) may enable key word searches of listings published via the networked system 202. A browse application may allow users to browse various category, catalogue, or inventory data structures according to which listings may be classified within the networked system 202. Various other navigation applications may be provided to supplement the search and browsing applications.

In order to make listings, available via the networked system 202, as visually informing and attractive as possible, the marketplace applications 220 may include one or more imaging applications 316 which users may utilize to upload images for inclusion within listings. An imaging application 316 also operates to incorporate images within viewed listings. The imaging applications 316 may also support one or more promotional features, such as image galleries that are presented to potential buyers. For example, sellers may pay an additional fee to have an image included within a gallery of images for promoted items.

Publications creation 318 allows sellers to conveniently author listings pertaining to goods or services that they wish to transact via the networked system 202, and publication management 320 allows sellers to manage such listings. Specifically, where a particular seller has authored and/or published a large number of listings, the management of such listings may present a challenge. The listing management applications 320 provide a number of features (e.g., auto-relisting, inventory level monitors, etc.) to assist the seller in managing such listings. One or post publication management 322 also assist sellers with a number of activities that typically occur post-listing. For example, upon completion of an auction facilitated by one or more auction applications 302, a seller may wish to leave feedback regarding a particular buyer. To this end, a post-listing management application 322 may provide an interface to one or more reputation applications 308, so as to allow the seller to conveniently provide feedback regarding multiple buyers to the reputation applications 308.

Dispute resolution applications 324 provide mechanisms whereby disputes arising between transacting parties may be resolved. For example, the dispute resolution applications 324 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 326 implement fraud detection and prevention mechanisms to reduce the occurrence of fraud within the networked system 202.

Messaging applications 328 are responsible for the generation and delivery of messages to users of the networked system 202, such messages, for example, advising users regarding the status of listings at the networked system 202 (e.g., providing "outbid" notices to bidders during an auction process or to provide promotional and merchandising information to users). Respective messaging applications 328 may utilize any one of a number of message delivery networks and platforms to deliver messages to users. For example, messaging applications 328 may deliver e-mail, Instant Message (IM), SMS, text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 330 support various merchandising functions that are made available to sellers to enable sellers to increase sales via the networked system 202. The merchandising applications 330 also operate the various merchandising features that may be invoked by sellers and may monitor and track the success of merchandising strategies employed by sellers.

The networked system 202 itself, or one or more parties that transact via the networked system 202, may operate loyalty programs that are supported by one or more donations applications 332. For example, a buyer may earn loyalty or promotions points for each transaction established and/or concluded with a particular seller, and may thereby be offered a reward for which accumulated loyalty points can be redeemed.

Returning to FIG. 13, various tables may be maintained within the databases 226, and may be utilized by and support the applications 220 and 222. A user table contains a record for each registered user of the networked system 202, and may include identifier, address and financial instrument information pertaining to each such registered user. A user may operate as a seller, a buyer, or both within the networked system 202. In one example embodiment, a buyer may be a user that has accumulated value (e.g., commercial or proprietary currency), and is accordingly able to exchange the accumulated value for items that are offered for sale by the networked system 202.

The tables also include an items table in which are maintained item records for goods and services that are available to be, or have been, transacted via the networked system 202. Each item record within the items table may furthermore be linked to one or more user records within the user table, so as to associate a seller and one or more actual or potential buyers with each item record.

A transaction table contains a record for each transaction (e.g., a purchase or sale transaction) pertaining to items for which records exist within the items table.

An order table is populated with order records, with each order record being associated with an order. Each order, in turn, may be processed with respect to one or more transactions for which records exist within the transaction table.

Bid records within a bids table each relate to a bid received at the networked system 202 in connection with an auction-format listing supported by an auction application 302. A feedback table is utilized by one or more reputation applications 308, in one example embodiment, to construct and maintain reputation information concerning users. A history table maintains a history of transactions to which a user has been a party. One or more attributes tables record attribute information pertaining to items for which records exist within the items table. Considering only a single example of such an attribute, the attributes tables may indicate a currency attribute associated with a particular item, the currency attribute identifying the currency of a price for the relevant item as specified in by a seller.

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiples of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation and store the output of that operation in a memory device to which it is communicatively coupled. A further component may then, at a later time, access the memory device to retrieve and process the stored output. Components may also initiate communication with input or output devices and can operate on a resource (e.g., a collection of information).

Example embodiments may be implemented in digital electronic circuitry, or in computer hardware, firmware, software, or in combinations of them. Example embodiments may be implemented using a computer program product, such as a computer program tangibly embodied in an information carrier, or a computer program in a machine-readable medium for execution by, or to control the operation of, data processing apparatus including, but not limited to, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a Field Programmable Gate Array (FPGA) or an Application-Specific Integrated Circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 15:
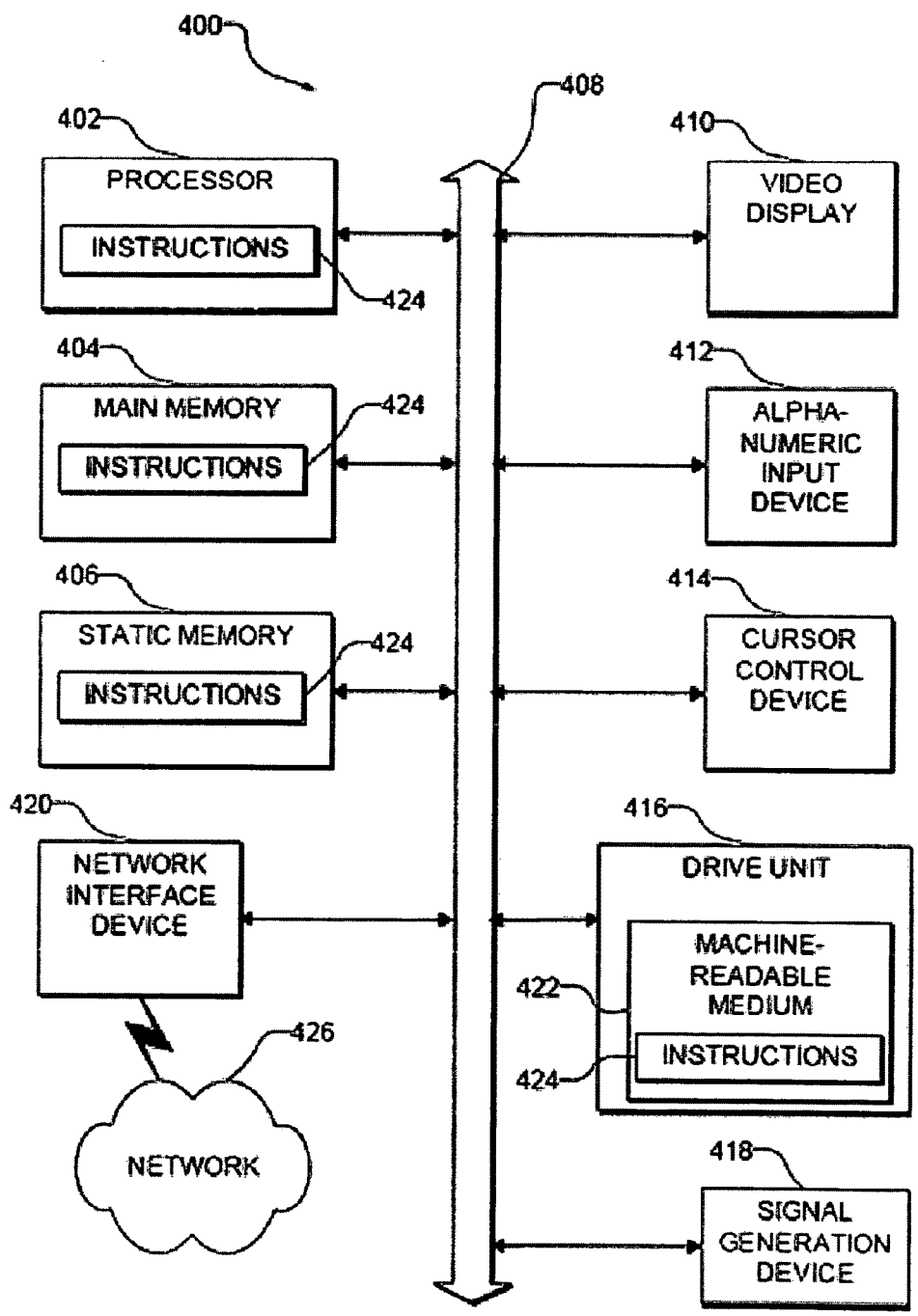
FIG. 15 is a block diagram illustrating a computing system configured to implement an image processing service, according to an example embodiment.

FIG. 15 is a block diagram of machine in the example form of a computer system 400 within which instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a Central Processing Unit (CPU), a Graphics Processing Unit (GPU) or both), a main memory 404, and a static memory 406, which communicate with each other via a bus 408. The computer system 400 may further include a video display unit 410 (e.g., a Liquid Crystal Display (LCD) or a Cathode Ray Tube (CRT)). The computer system 400 also includes an alphanumeric input device 412 (e.g., a keyboard), a User Interface (UI) navigation device or cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies presented herein or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read Only Memory (EPROM), Electrically Erasable Programmable Read Only Memory (EEPROM), and flash memory devices; magnetic disks such as internal hard disks and removable disks; magneto-optical disks; and Compact Disc-Read Only Memory (CD-ROM) discs and Digital Video Disc-Read Only Memory (DVD-ROM) discs.

The software 424 may further be transmitted or received over a communications network 426 using a transmission medium. The software 424 may be transmitted using the network interface device 420 and any one of a number of well-known transfer protocols (e.g., HTTP). Examples of communication networks include a Local Area Network (LAN), a WAN, the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible medium to facilitate communication of such software.

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier and/or to a backend, or storage tier. The processing performed by the logic tier may relate to certain rules or processes that govern the software as a whole. A third, storage, tier may be a persistent storage medium or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The example three-tier architecture, and the technologies through which it is implemented, may be realized on one or more computer systems operating, for example, as a stand alone system, or organized in a server-client, peer-to-peer, distributed or so some other suitable configuration. Further, these three tiers may be distributed between more than one computer systems as various components.

Example embodiments may include the above described tiers, and processes or operations about constituting these tiers may be implemented as components. Common to many of these components is the ability to generate, use, and manipulate data. The components, and the functionality associated with each, may form part of stand alone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various APIs), and may be compiled into one complete server, client, and/or peer software application. Further, these APIs may be able to communicate through various distributed programming protocols as distributed computing components.

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a stand alone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model or TCP/IP protocol stack model for defining the protocols used by a network to transmit data.

Example embodiments may use the OSI model or TCP/IP protocol stack model for defining the protocols used by a network to transmit data. In applying these models, a system of data transmission between a server and client, or between peer computer systems may, for example, include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation, using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, and additionally Asynchronous Transmission Mode (ATM) or some other suitable protocol. These networks may be organized within a variety of topologies (e.g., a star topology), or structures.

Although an embodiment has been described with reference to specific example embodiments, it will be evident that various modifications and changes may be made to these embodiments. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   receiving, from a camera-enabled mobile device, a request to prepare a product for publication, the request including an image, the image including identifying information associated with the product being prepared for the publication as a listing on a network based publication system, the image being taken by the camera-enabled mobile device;
   matching, using one or more image processing services, the identifying information included in the received image and one or more additional products, the matching being performed by one or more hardware processors;
   accessing product information describing the one or more additional products based on the matching of the identifying information included in the received image and the one or more additional products, the product information including one or more additional images associated with the one or more additional products; and
   in response to the receiving of the request from the camera-enabled mobile device, causing enhancement of a user interface associated with the camera-enabled device to enable the publication of the product as the listing on the network based publication system to enable viewing of the enhanced user interface by other devices accessing the network based publication system, the causing of the enhancement including:
   generating, in an automated operation without user intervention and based on the one or more additional images, one or more selectable additional image features each for selection of a particular additional image via the user interface,
   generating one or more input features associated with each one or more selectable additional images, each input feature for receiving additional data associated with the product depicted in the particular additional image, and
   presenting, in the user interface, the one or more selectable additional image features and the one or more input features associated with each one or more selectable additional images.

2. The method of claim 1, wherein the identifying of the product from the image includes comparing the image to a database of items, wherein the causing further comprises including, in the enhanced user interface, a category for the product and a price for the product, the category and the priced determined based on the product information describing the one or more matching additional products.

3. The method of claim 2, wherein the one or more image processing services compare at least one characteristic of the image to the database of items, the at least one characteristic of the image comprising at least one of a color, a shape, or a texture.

4. The method of claim 1, herein the request includes user-supplied information in addition to the image.

5. The method of claim 1, wherein the user-supplied information includes a product category for the product.

6. The method of claim 1, wherein the request is received as an email message, and wherein a command is included in the email message.

7. The method of claim 6, wherein the command is included in the subject line of the email message.

8. The method of claim 6, wherein the command is included in the body of the email message.

9. The method of claim 6, wherein the command is to compare image data to the database of products.

10. The method of claim 1, wherein the request is received as an HTTP message.

11. The method of claim 1, wherein the one or more image processing services include a fraud detection service, and wherein the image is compared to the product information to identify an inconsistency.

12. The method of claim 11, further comprising transmitting a notification of an inconsistency between the image and valid product information.

13. The method of claim 12, wherein the image resulting in an inconsistency is stored in a fraud records database, and wherein the fraud detection service compares subsequently received image data to the image stored in the fraud records database.

14. The method of claim 1, wherein the product information further identifies at least one web page having a detailed description of the product.

15. A system comprising:
   one or more hardware processors of a machine; and
   a machine-readable medium storing instructions that, when executed by the one or more hardware processors, cause the machine to perform operations comprising:
   receiving, from a camera-enabled mobile device, a request to prepare a product for publication, the request including an image, the image including information associated with the product being prepared for publication as a listing on a network based publication system, the image taken by the camera: enabled mobile device;

matching, using one or more image processing services, the identifying information included in the received image and one or more additional products;

accessing product information describing the one or more additional products based on the matching of the identifying information included in the received image and the one or more additional products, the product information including one or more additional images associated with the one or more additional products; and in response to the receiving of the request from the camera-enabled mobile device, causing enhancement of a user interface associated with the camera-enabled device to enable the publication of the product as the listing on the network based publication system to enable viewing of the enhanced user interface by other devices accessing the network based publication system, the causing of the enhancement including:

generating, in an automated operation without user intervention and based on the one or more additional images, one or more selectable additional image features each for selection of a particular additional image via the user interface, generating one or more input features associated with each one or more selectable additional images, each input feature for receiving additional data associated with the product depicted in the particular additional image, and presenting, in the user interface, the one or more selectable additional image features and the one or more input features associated with each one or more selectable additional images.

16. The system of claim 15, wherein the product information includes price information for the product, wherein the causing further comprises including, in the enhanced user interface, a category for the product and a price for the product, the category and the priced determined based on the product information describing the one or more matching additional products.

17. The system of claim 15, wherein the product information includes an additional image of the product.

18. The system of claim 15, wherein the product information includes a unique identifier of the product.

19. The system of claim 15, wherein the request further includes a user-specified command.

20. The system of claim 15, wherein the operations further comprise:

generating, in an automated operation without user intervention, a publication that includes the particular additional image, based on a selection of a selectable additional image feature, and additional data associated with the product depicted in the particular additional image, based on input via a particular input feature; and listing, using the publication, the product depicted in the particular additional image on the network based publication system.

21. The system of claim 14, wherein the operations further comprise receiving user input specifying one or more characteristics of the product for inclusion in a publication.

22. A non-transitory computer-readable medium comprising instructions, that, when executed by one or more hardware processors, cause the one or more hardware processors to perform operations comprising:

receiving, from a camera enabled mobile device, a request to prepare a product for publication, the request including an image, the image including identifying information associated with the product being prepared for publication as a listing on a network based publication system, the image being taken by the camera-enabled mobile device;

matching, using one or more image processing services, the identifying information included in the received image and one or more additional products;

accessing product information describing the one or more additional products based on the matching of the identifying information included in the received image and the one or more additional products, the product information including one or more additional images associated with the one or more additional products; and in response to the receiving of the request from the camera-enabled mobile device, causing enhancement of a user interface associated with the camera-enabled device to enable the publication of the product as the listing on the network based publication system to enable viewing of the enhanced user interface by other devices accessing the network based publication system, the causing of the enhancement including:

generating, in an automated operation without user intervention and based on the one or more additional images, one or more selectable additional image features each for selection of a particular additional image via the user interface, generating one or more input features associated with each one or more selectable additional images, each input feature for receiving additional data associated with the product depicted in the particular additional image, and presenting, in the user interface, the one or more selectable additional image features and the one or more input features associated with each one or more selectable additional images.

23. The non-transitory computer-readable medium of claim 22, wherein the request includes a product category, wherein the causing further comprises including, in the enhanced user interface, a category for the product and a price for the product, the category and the price determined based on the product information describing the one or more matching additional products.

24. The non-transitory computer-readable medium of claim 22, wherein the operations further comprise receiving user input specifying one or more characteristics of the product for inclusion in a publication.

25. The non-transitory computer-readable medium of claim 24, wherein one or more characteristics of the product include product details.

26. The non-transitory computer-readable medium of claim 24, wherein one or more characteristics of the product include at least one of a size, a color, and a texture.

27. The non-transitory computer-readable medium of claim 22, wherein the operations further comprise receiving user input specifying an additional image of the product for inclusion in a publication.

28. The non-transitory computer-readable medium of claim 22, wherein the operations further comprise receiving user input specifying a schedule for listing the product.

29. A method, comprising:

receiving, from a camera-enabled mobile device, a request that includes an image data, the image data including identifying information associated with a first product and a second product, the image data being generated by the camera-enabled mobile device, the first product and the second product being prepared for publication as a listing on a network based publication system;

matching, using one or more image processing services, the identifying information included in the received image data and one or more additional products;

accessing product information describing the one or more products based on the matching of the identifying information included in the received image data and the one or more additional products, the product information including one or more additional images associated with the one or more additional products;

in response to the receiving of the request from the camera-enabled mobile device, causing enhancement of a user interface associated with the camera-enabled device to enable the publication of the first product and the second product as the listing on the network based publication system to enable viewing of the enhanced user interface by other devices accessing the network based publication system, the causing of the enhancement including:

generating, in an automated operation without user intervention, and based on the one or more additional images, one or more selectable additional image features each for selection of a particular additional image via the user interface, generating one or more input features associated with each one or more selectable additional images, each input feature for receiving additional data associated with the product depicted in the particular additional image, and presenting, in the user interface, the one or more selectable additional image features and the one or more input features associated with each one or more selectable additional images.

30. The method of claim 29, wherein the image data includes a barcode, and wherein a first image processing service of the one or more processing services maps the barcode to at least one of the first product or second product in the product database.

31. The method of claim 29, wherein the image data further includes a product title.

32. The method as in claim 29, wherein the image data is a photographic image, and the operations further comprise extracting textual information from the image data.

33. The method of claim 29, wherein the image data includes a product identifier.

* * * * *